(12) United States Patent
Han et al.

(10) Patent No.: US 12,505,592 B2
(45) Date of Patent: Dec. 23, 2025

(54) SYSTEMS AND VISUALIZATION METHODS FOR INTRAOPERATIVE VOLUMETRIC IMAGING OF TISSUE SAMPLES

(71) Applicant: CLARIX IMAGING CORPORATION, Chicago, IL (US)

(72) Inventors: Xiao Han, Chicago, IL (US); Christian Wietholt, Naperville, IL (US)

(73) Assignee: Clarix Imaging Corporation, Chicago, IL (US)

( * ) Notice: Subject to any disclaimer, the term of this patent is extended or adjusted under 35 U.S.C. 154(b) by 355 days.

(21) Appl. No.: 17/779,449

(22) PCT Filed: Nov. 26, 2020

(86) PCT No.: PCT/US2020/062462
§ 371 (c)(1),
(2) Date: May 24, 2022

(87) PCT Pub. No.: WO2021/108742
PCT Pub. Date: Jun. 3, 2021

(65) Prior Publication Data
US 2023/0025370 A1    Jan. 26, 2023

Related U.S. Application Data

(60) Provisional application No. 62/940,377, filed on Nov. 26, 2019, provisional application No. 62/940,383, (Continued)

(51) Int. Cl.
*G06T 11/00* (2006.01)
*G01N 23/046* (2018.01)
(Continued)

(52) U.S. Cl.
CPC .......... *G06T 11/008* (2013.01); *G01N 23/046* (2013.01); *G01N 23/083* (2013.01);
(Continued)

(58) Field of Classification Search
None
See application file for complete search history.

(56) References Cited

U.S. PATENT DOCUMENTS

| 5,216,596 | A | 6/1993 | Weinstein |
| 10,247,682 | B2 * | 4/2019 | Schlecht ................ A61B 6/032 |

(Continued)

FOREIGN PATENT DOCUMENTS

| JP | 2004357789 A | 12/2004 |
| JP | 2012040160 A | 3/2012 |

(Continued)

OTHER PUBLICATIONS

The International Search Report (ISR) with Written Opinion for PCT/US2020/062462 dated Apr. 9, 2021, pp. 1-19.
(Continued)

*Primary Examiner* — Edwin C Gunberg
(74) *Attorney, Agent, or Firm* — McDonnell Boehnen Hulbert & Berghoff LLP

(57) ABSTRACT

Systems and methods are provided for improved intraoperative micro-CT imaging of explanted tissue samples and for improved visualization of such samples. These embodiments provide for reduced scan times and the ability for radiologists to quickly receive useful scan imagery and to provide accurately-communicated recommendations to the operating surgeon. Improved scan visualization methods facilitate surgeon and radiologist interaction with the scan data, including of annotation, viewing, and re-orientation to accurately reflect the orientation of imaged tissue samples relative to the body prior to explantation. Improved visualization methods include color-coded sample texturing to indicate sample orientation, color-coded tumor visualization to indicate proximity to sample margins, and intuitive meth-
(Continued)

ods for adjusting the location and orientation of two-dimensional visualizations relative to the sample.

32 Claims, 11 Drawing Sheets

Related U.S. Application Data filed on Nov. 26, 2019, provisional application No. 62/940,411, filed on Nov. 26, 2019.

(51) Int. Cl.
*G01N 23/083* (2018.01)
*G06T 7/10* (2017.01)
*G06T 7/70* (2017.01)

(52) U.S. Cl.
CPC ............. *G06T 7/10* (2017.01); *G06T 7/70* (2017.01); *G01N 2223/301* (2013.01); *G01N 2223/307* (2013.01); *G01N 2223/419* (2013.01); *G01N 2223/601* (2013.01); *G01N 2223/6126* (2013.01); *G06T 2200/24* (2013.01); *G06T 2207/10024* (2013.01); *G06T 2207/10081* (2013.01); *G06T 2207/10116* (2013.01); *G06T 2207/20101* (2013.01); *G06T 2210/41* (2013.01); *G06T 2211/436* (2013.01)

(56) References Cited

U.S. PATENT DOCUMENTS

| | | | | |
|---|---|---|---|---|
| 11,457,878 | B2* | 10/2022 | Kudo | G06T 11/005 |
| 2004/0240752 | A1* | 12/2004 | Dobbs | H04N 19/103 |
| | | | | 348/E7.071 |
| 2006/0250518 | A1 | 11/2006 | Nilson et al. | |
| 2008/0055305 | A1* | 3/2008 | Blank | G06T 15/08 |
| | | | | 345/419 |
| 2010/0172463 | A1* | 7/2010 | Purchio | A61B 6/481 |
| | | | | 378/4 |
| 2010/0231509 | A1* | 9/2010 | Boillot | G06F 3/0304 |
| | | | | 606/1 |
| 2010/0303329 | A1 | 12/2010 | Morton | |
| 2012/0157830 | A1 | 6/2012 | Boyden et al. | |
| 2013/0010927 | A1 | 1/2013 | Seppi et al. | |
| 2013/0021336 | A1 | 1/2013 | Tsukagoshi et al. | |
| 2016/0109389 | A1 | 4/2016 | Suzuki et al. | |
| 2018/0025546 | A1 | 1/2018 | Buelow et al. | |

FOREIGN PATENT DOCUMENTS

| | | |
|---|---|---|
| JP | 2012217633 A | 11/2012 |
| JP | 2014110889 A | 6/2014 |
| JP | 2014121596 A | 7/2014 |
| JP | 2014212904 A | 11/2014 |
| JP | 2017189460 A | 10/2017 |
| JP | 2018533731 A | 11/2018 |

OTHER PUBLICATIONS

Marai et al., "A Kinematics-Based Method For Generating Cartilage Maps and Deformations in the Multi-Articulating Wrist Joint From CT Images", Proceedings of the 28th IEEE, EMBS Annual International Conference, Aug. 30-Sep. 3, 2006, pp. 2079-2082.
Axer et al., "Estimating Fiber Orientation Distribution Functions in 3D-Polarized Light Imaging", frontiers in Neuroanatomy, Apr. 2016, vol. 10, Article 40, 12 pages.
McClatchy III et al., "Calibration and analysis of a multimodal micro-CT and structured light imaging system for the evaluation of excised breast tissue", Physics in Medicine & Biology, 62 (2017), pp. 8983-9000.
Clackdoyle et al., "Quantitative Reconstruction From Truncated Projections in Classical Tomography," Oct. 2024.†
Faxitron CT User Manual (Rev 001) Sep. 18, 2019 (Hologic Inc.).†
Third Party Observation for application No. EP20200892408 (NPL3) available at: https://register.epo.org/application?documentId=LNA4TCFQ155OKTV&numberEP20892408&lngen&nplfalse.†

\* cited by examiner
† cited by third party

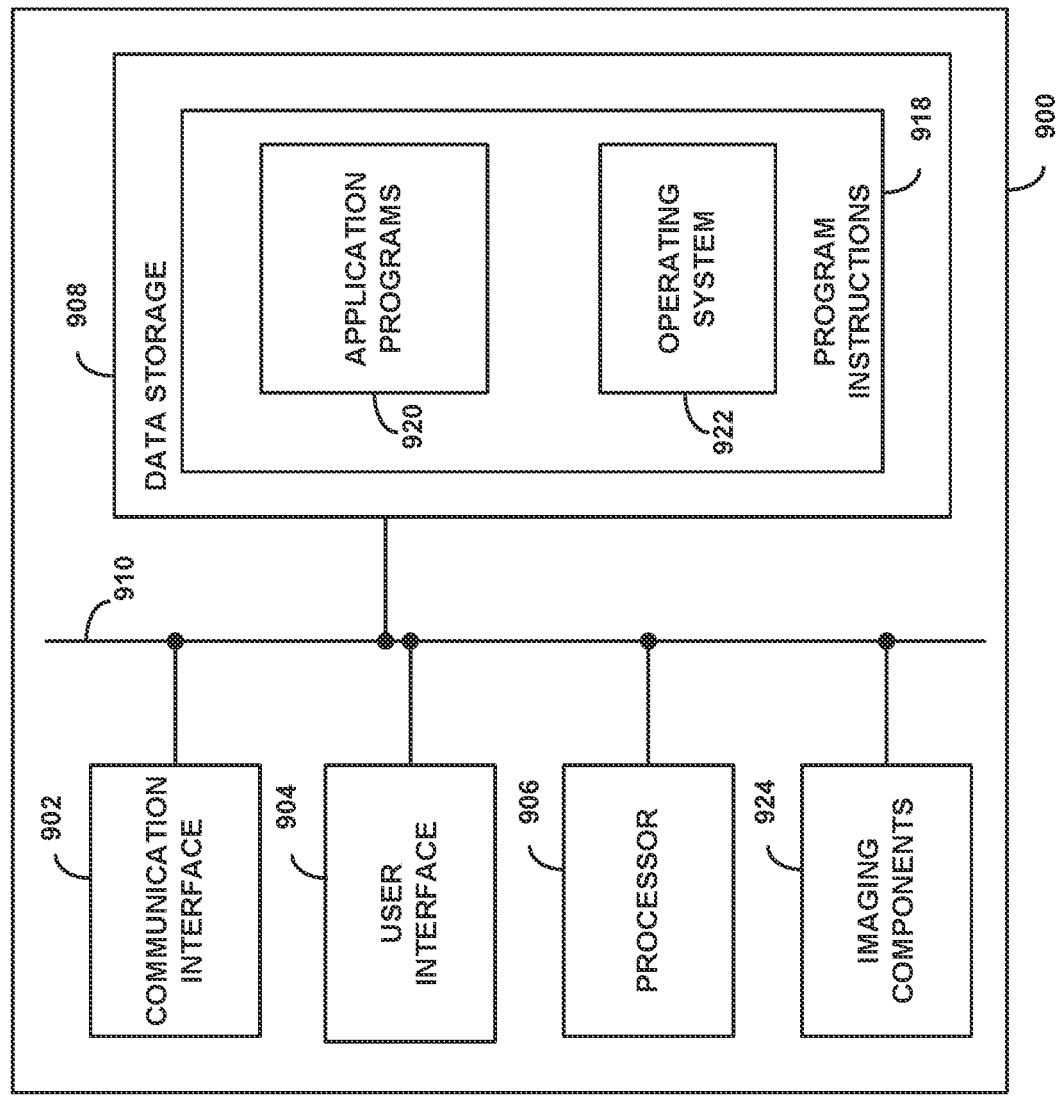

SYSTEMS AND VISUALIZATION METHODS FOR INTRAOPERATIVE VOLUMETRIC IMAGING OF TISSUE SAMPLES

CROSS-REFERENCE TO RELATED APPLICATIONS

This application calls priority to U.S. provisional application No. 62/940,377, filed Nov. 26, 2019, U.S. provisional application No. 62/940,383, filed Nov. 26, 2019, and U.S. provisional application No. 62/940,411, filed Nov. 26, 2019, the contents of which are hereby incorporated by reference. The contents of U.S. Pat. No. 8,605,975, filed Oct. 11, 2010, U.S. application no. 2014/0161332, filed Dec. 2, 2013, U.S. Pat. No. 9,189,871, filed Dec. 29, 2014, U.S. Pat. No. 9,613,442, filed Nov. 5, 2015, PCT application no. US18/52175, filed Sep. 21, 2018, and U.S. Provisional Patent Application No. 62/562,138, filed on Sep. 22, 2017, are also hereby incorporated by reference.

BACKGROUND

The treatment for a variety of health conditions can include the removal of specified tissues from the body. For example, treatment of certain cancers can include surgically removing one or more tumor masses from the body. Other conditions can be treated by removal of other types of tissue, foreign bodies, or other masses from the body. In performing such a removal, it is desirable to ensure complete removal of the target tissue while removing as little as possible of nearby healthy tissue. In practice, surgeons will often remove additional tissue around the target in order to ensure that the target is fully removed (e.g., to prevent relapse due to remnant tumor tissue continuing to grow).

To determine whether the entire target has been removed, the removed tissue may be imaged to determine whether the target extends near, and possibly beyond, the margin of the explanted sample. This can include using computerized tomography (CT) or other volumetric imaging modalities, potentially in concert with an imaging contrast agent, to develop a three-dimensional scan of the sample and of the target tissue within. The surgeon, a radiologist, or some other healthcare professional can then analyze the scan data to determine whether it is likely that additional tissue needs to be removed from the patient, and if so, the particular location within the body from which that additional tissue should be removed. In practice, the surgeon may use sutures, staples, ink or other means to indicate the orientation of the explanted tissue relative to the patient's body. Despite these and other measures, the radiologist and the surgeon often differ with respect to their understanding of the orientation of the tissue sample, leading to difficulties in communicating the radiologist's recommendation to the surgeon.

SUMMARY

An aspect of the present disclosure relates to a system including: (i) a portable housing; (ii) an imager disposed on or within the housing, wherein the imager is operable to image samples of interest; (iii) a communications interface disposed on or within the housing; and (iv) a controller disposed on or within the housing, wherein the controller comprises one or more processors programmed to perform controller operations, wherein the controller is operably coupled to the image and to the communications interface, and wherein the controller operations include: (a) operating the imager to generate scan data for a target sample; (b) based on the scan data, using a reconstruction process to generate volumetric density information for the target sample; (c) receiving, from a remote system via the communications interface, a request for a particular cross-sectional view of the target sample; (d) responsive to receiving the request for the particular cross-sectional view of the target sample, rendering a two-dimensional image of the target sample from the volumetric density information, wherein the two-dimensional image of the target sample represents the target sample according to the requested particular cross-sectional view; and (e) transmitting, to the remote system via the communications interface, an indication of the two-dimensional image.

Another aspect of the present disclosure relates to a method for providing a user interface, the method including: (i) providing, in a first pane of a user interface, a perspective representation of volumetric density information for a target sample, wherein the volumetric density information has an orientation relative to a three-dimensional space, and wherein the three-dimensional space is characterized by three orthogonal axes; and (ii) providing, in a second pane of the user interface while the user interface is displaying the perspective representation of the volumetric density information, a two-dimensional image of the target sample, wherein the two-dimensional image of the target sample represents the volumetric density information according to a cross-sectional view through a specified view point within the three-dimensional space and orthogonal to a first axis of the three orthogonal axes.

Another aspect of the present disclosure relates to a micro-CT imaging system including: (i) a micro-CT imager comprising an X-ray source, an X-ray imager, and a sample receptacle configured to contain a target sample, wherein the X-ray source and the X-ray imager define a field of view; and (ii) a controller, wherein the controller comprises one or more processors programmed to perform controller operations, wherein the controller is operably coupled to the image and to the communications interface, and wherein the controller operations include: operating the imager to generate scan data for a target sample, wherein operating the imager to generate scan data for the target sample comprises rotating the sample receptacle and operating the X-ray source and the X-ray imager to generate a plurality of X-ray images of the target sample.

Yet another aspect of the present disclosure relates to a transitory or non-transitory computer-readable medium configured to store at least computer-readable instructions that, when executed by one or more processors of a computing device, causes the computing device to perform controller operations to perform the method of any of the above aspects and/or to perform the listed controller operations of any the above aspects.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 9 is a simplified block diagram showing some of the components of an example system.

DETAILED DESCRIPTION

Figure 1:
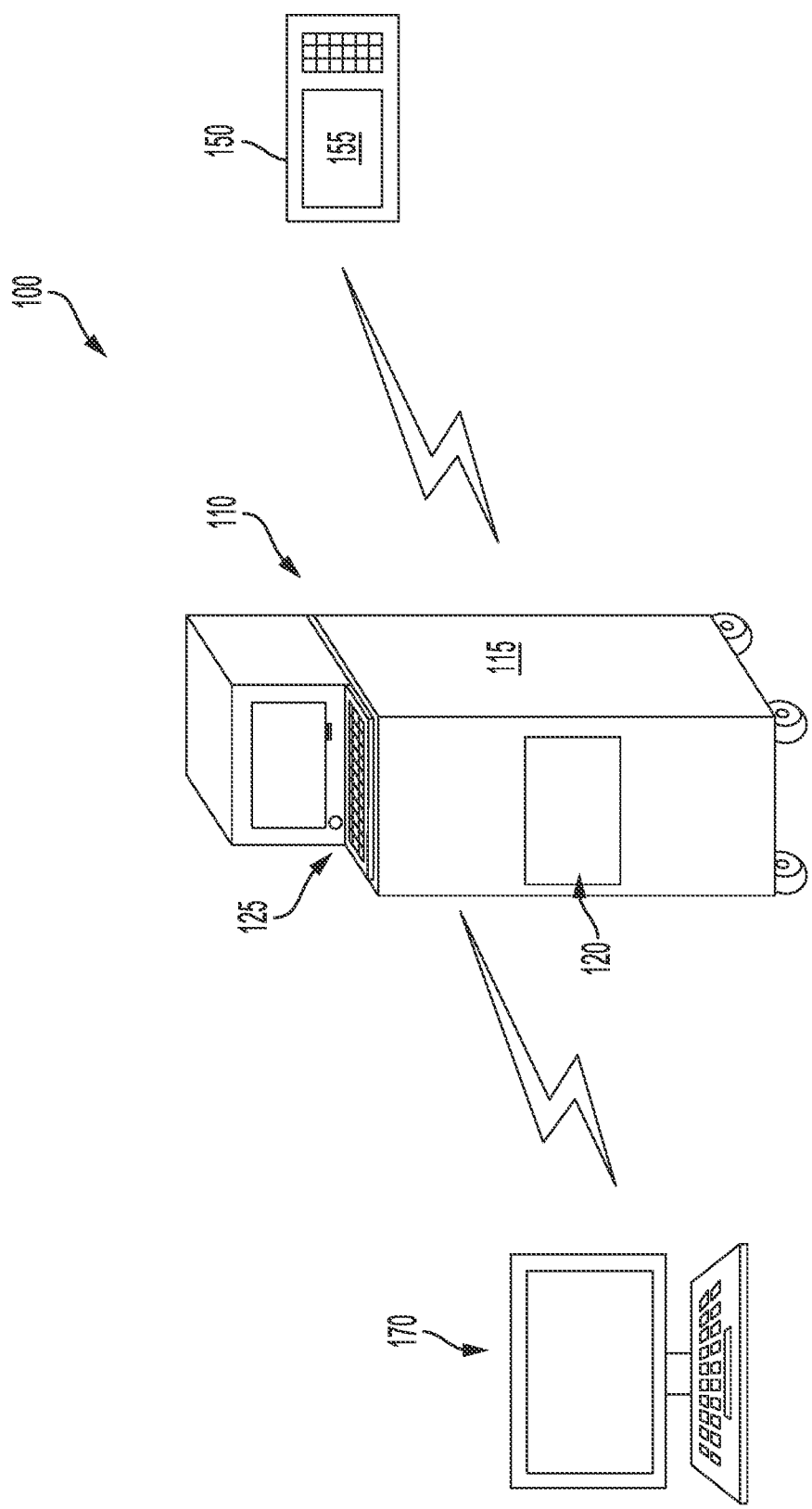
FIG. 1 depicts elements of an example system.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. Overview

A variety of clinical interventions involve the removal of tumors or other undesirable tissue or substances. Ideally, only the unwanted tissue would be removed, sparing neighboring tissue. This is difficult to achieve in practice, so surgeons will often excise more tissue than is necessary so as to prevent leaving any of the unwanted tissue in the body where it can, e.g., lead to relapse. In order to avoid leaving any tumor or other unwanted tissue in the body, the explanted tissue sample can be imaged to determine whether the target tissue (e.g., tumor) extends to, or near, any of the margins of the sample. If it does, the image data can be used to determine where to remove additional tissue.

In many hospitals, imaging of such samples includes transporting the sample to a central imaging system that is in a different location than the operating room. The image data is then analyzed by a radiologist in yet another location. The radiologist then relays their conclusions, often via telephone, to the surgeon. Such a scenario results in significant delays between the removal of the sample and the time when a surgeon receives information to continue the procedure, either by removing additional tissue or by completing the procedure. Alternatively, the procedure may be completed and the imaging data used to determine whether to perform an separate, additional revision procedure. In many instances, the surgeon and the radiologist may differ with respect to their understanding of the orientation of the sample relative to the patient's body (e.g., with respect to which portion of the sample is dorsal, which is medial, which is anterior, etc.). This can result in difficulties in communicating the radiologist's assessment, as the radiologist's instructions as to which margin to further resect (e.g., the anteromedial margin) may be based on an incorrect understanding of the orientation of the sample relative to the body. While the surgeon may attempt to improve this situation by adding wires, sutures, staples, ink, or other marking materials to the sample to properly orient the radiologist, there still can be issues with the radiologist's understanding of the sample's orientation.

Embodiments described herein provide a variety of benefits, including benefits that address the above issues. These embodiments include a fast, portable volumetric imaging system. This system can provide a surgeon with faster feedback by locating the imaging system in the same room as the surgeon and by reducing scan times to less than 15 minutes.

This portable imaging system is configured to scan tissue samples (e.g., using X-ray micro-CT) and to reconstruct volumetric density information for the sample. Depending on the imaging system(s) employed, such volumetric density information could represent the density of unpaired hydrogen atoms in the sample, the density of gadolinium atoms or other contrast agents in the sample, the X-ray radiodensity or radiopacity of the sample, or some other information about the variation of a physical property throughout the volume of the sample. Client devices, e.g., a radiologist's workstation, can then request images of the sample from the imaging system, which renders the requested images (e.g., views at specified locations and/or angles within the sample) and sends them to the requesting device. By operating in this manner, the client devices can be relatively cheap or otherwise computationally limited, reducing costs. Additionally, bandwidth requirements are reduced, as is dependence upon centralized image serving systems.

Also provided are a variety of user interface improvements to ease surgeon interaction with scan data in an intra-operative setting, to improve communication of sample orientation and target localization between the surgeon and radiologist, and to provide other benefits. A two-pane user interface is provided that includes a perspective view of the sample volumetric image data in one pane and a 2D cross-sectional slice image in the other pane, with the plane of the 2D slice selectable by the surgeon.

Also provided are improvements in the visualization of a tumor or other contents of interest within the imaged sample. These improvements include color-coding the surface of a target volume within the sample according to how close the nearest margin of the sample is to the segment. This can provide a clear indication to the surgeon as to where the target (e.g., tumor) might have extended past the edge of the sample, indicating that there may be more of the target still in the patient's body and where that remnant target is located.

Also provided are improvements in interacting with the volumetric imaging data to re-orient the data according to the surgeon's assessment of its orientation relative to the patient's body. Thus, a radiologist's later assessment or analysis of the scan data will better correspond to the surgeon's understanding of the sample's orientation. Perspective representations of the sample may also be 'virtually inked' automatically and/or by the surgeon to provide a clear visual indication of the orientation of the sample in the user interface.

A variety of improvements to the micro-CT volumetric imaging system are also provided. These improvements include the use of an actuated sample loading gantry, which can reduce the likelihood that an operator inserting a sample into the system causes damage or misalignment of the system. Further, the actuated loading and rotation of the sample allows improved non-uniform scan reconstruction algorithms to be applied, for example, reduced-view or sparse-view reconstruction algorithms. This can i) reduce the scan time, ii) increase the size of samples able to be imaged by using an offset scanning mode, and/or iii) reduce system cost by reducing the size of X-ray imaging sensor required to image a sample of a specified size.

It should be understood that the above embodiments, and other embodiments described herein, are provided for explanatory purposes, and are not intended to be limiting.

II. Example Systems for Portable Tissue Sample Imaging and Reconstruction

As noted above, it can be beneficial to provide an imaging system (e.g., a portable imaging system) in the operating room to reduce turnaround time in generating usable imaging data of tissue samples. By providing high-quality imaging data to the surgeon during a procedure, the occurrence of revision surgeries can be reduced by increasing the likelihood that the surgeon is able to remove all of a tumor (or other target tissue) during a single procedure. Additionally, the surgeon's comprehension of the imaging data can be improved by reducing the imaging time and by reducing the amount of sample handling that occurs between removal of the sample by the surgeon and imaging of the sample by a micro-CT system or other imager.

It is also beneficial for such an imaging system to perform the reconstruction and rendering of imaging data for the sample locally, rather than using a remote server or other nonlocal computational resources. The imaging system could include a number of graphical processing units (GPUs) or other computing components configured to reconstruct volumetric density information for the sample based on a plurality of x-ray images of the sample taken from different relative locations and/or angles. These computing components can then render, from the volumetric density data, two-dimensional images of the sample as requested by the surgeon, by a radiologist, or by some other user. Such requests could be generated by a radiologist's workstation in a radiology reading room or other location, by a remote display and/or control device in the operating room, or by some other device in some other location.

Performing reconstruction and rendering locally on the imaging system can provide a variety of benefits. Users can interact with the imaging data at a high level, requesting two-dimensional cross-sectional slice images through the volumetric density information, perspective views of the volumetric density information (e.g., semi-transparent renders with wires, staples, tumors, or other internal structures indicated, projections of the volumetric density of the sample), or other imagery despite using a thin client or other compute-limited and/or bandwidth-limited system. This allows a radiologist or other healthcare professional to interact with and analyze the volumetric density information on lower-cost equipment and/or at locations distant from the operating room.

Locally reconstructing and rendering image data on the imaging system also allows users to avoid relying on central hospital systems (e.g., a hospital's Picture Archiving and Communication System (PACS)), which may exhibit latency or other unwanted effects and which may be affected by varying system load due to use by other users. Rendering individual views based on user requests also allows the system to avoid sending the entirety of the volumetric density information, or sending a large set of pre-rendered images thereof (e.g., stacks of two-dimensional slice images), to a radiologist's workstation or other user terminal. This allows the user to begin interacting with the imaging data without waiting for such a large data transfer to complete.

FIG. 1 illustrates an example system 100 that includes such an in-operating room imaging system 110 and a remote interface 150 and a remote workstation 170 in wired or wireless communication therewith. The imaging system 110 includes a housing 115 on or within which an imager 120 (e.g., a micro-CT imager) and a user interface 125 are disposed. As shown, the imaging system 110 includes casters facilitating movement of the imaging system 110, however, it is to be understood that an imaging system as described herein could alternatively be a benchtop system, a system mounted to a wall or a floor, or configured in some other manner. Additionally, while the example imaging system 110 includes a user interface 125 mounted on and/or into the housing 115, it is to be understood that an imaging system as described herein could lack a display or other user interface elements (e.g., the system could be "headless"), with control of the system and/or accessing information determined thereby being accessed additionally or alternatively through a wired or wireless communication interface.

Further, the example imaging system 110 could include elements additional to those shown. For example, the imaging system 110 could include refrigeration elements, chemical storage, automated sample handling components, or other components configured to cool, freeze, fixate, stain, or otherwise preserve or prepare a sample before and/or after imaging the sample.

The remote interface 150 includes a display 155 and is configured to communicate with the imaging system 110 via wired or wireless means. Such a remote interface 150 could be provided in addition to, or alternative to, a user interface 125 disposed on or within the housing 115 of the imaging system 110. In some examples, the remote interface 150 could be removably mounted to the imaging system 110 such that the remote interface 150 acts as a sort of detachable display and user interface for the imaging system 110. The remote device 150 could be connected via an Ethernet cable or some other wired interface directly to the imaging system 110 and/or indirectly via a local network, the internet, and/or via some other means. The remote device 150 could be connected via a Bluetooth link, a WiFi link, or some other wireless interface directly to the imaging system 110 and/or indirectly via a local network, the internet, and/or via some other means.

The remote interface 150 can be configured to transmit commands (e.g., commands to initiate scanning, reconstruction, or other operations related to a tissue sample) or other information to and to receive imaging data or other information from the imaging system 110. This can include a controller or other system in the imaging system 110 controlling the display 155 or other elements of the remote interface 150 more directly, e.g., by polling the remote interface 150 for user inputs and, based on those inputs or other factors, transmitting images or other information to be displayed on the display 155 of the user interface 150. In another example, the remote interface 150 could operate more independently, transmitting requests to the imaging system 110 for two-dimensional views of the sample at specified locations and orientations relative to the sample and receiving, from the imaging system 110, indications of responsively rendered and transmitted two-dimensional views of the sample. By relying on the computational resources of the imaging system 110 to render the two-dimensional images requested by a user, the remote interface 150 can be relatively lightweight with respect to computational resources, power budget, bandwidth, and cost.

To reduce surgeon interaction with non-sterile elements, to avoid the necessity of autoclaving or otherwise sterilizing the user interfaces, and/or to provide some other benefits, one or both of the user interface 125 and/or the remote interface 150 could be configured for touchless interaction with a user. That is, the user interface 125 and/or the remote interface 150 could include one or more cameras, radar elements, capacitive sensors, infrared sensors, light curtains, and/or other elements configured to detect gestures, proximity, or other properties related to a user's inputs or intent without the user physically coming into contact with the user interface 125 and/or the remote interface 150.

The remote workstation 170 could be located in a radiology reading room, a radiologist's office, a radiologist's home, or some other remote location where a radiologist or other healthcare professional would want to access and interact with imaging data of a tissue sample. The remote workstation 170 could provide a user interface (e.g., a traditional four-pane imaging interface, having a perspective view and three orthogonal cross-sectional views of volumetric density information of a sample, a two-pane view as described herein having a perspective view and a single cross-sectional view) for accessing and interacting with imagery determined from and related to volumetric density information of a target sample. The remote workstation 170 could operate by transmitting requests to the imaging system 110 for two-dimensional views of the sample at specified locations and orientations relative to the sample and receiving, from the imaging system 110, indications of responsively rendered and transmitted two-dimensional views of the sample. Such two-dimensional views of the sample could include high-resolution cross-sectional slices through the sample, e.g., parallel to the principal anatomical planes of the sample. Such two-dimensional views of the sample could also include perspective view of the sample, e.g., renders of a mesh representing the outer surface or some other internal surface of the sample (e.g., a surface of a tumor, staple, or other detected internal contents of the sample), renders of the simulated view through the sample from a specified direction, or some other perspective view.

By relying on the computational resources of the imaging system 110 to render the two-dimensional images requested by a user, the remote workstation 170 can be relatively lightweight with respect to computational resources, power budget, bandwidth, and cost. In some examples, the remote workstation 170 could receive a three-dimensional mesh, lower-resolution version of the volumetric density information, or some other information about the three-dimensional structure or contents of the sample and could use such information to locally render perspective views of the sample, e.g., to reduce bandwidth usage, latency, and load on the imaging system 110 when a user is rotating, zooming, or otherwise interacting with a perspective representation of the sample on the remote workstation 170. Such operation can provide this functionality while still reducing the computational resources, power budget, bandwidth, and cost of the remote workstation 170 relative to, e.g., transmitting the entire set of volumetric density information for the sample to the remote workstation 170 and performing two-dimensional image rendering locally on the remote workstation 170.

The operation of the remote workstation 170, remote interface 150, and other remote systems as described herein is variously described as sending requests to an imaging system 110 for specified two-dimensional views of a sample in response to a user input requesting such views (e.g., a user input changing the plane of a cross-sectional view pane, a user input selecting a point of interest on a perspective view of a sample). In some examples, a remote system may retain a local cache of previously received two-dimensional images. In such examples, the remote system could search such an image cache to determine whether the system has a locally cached image that depicts a view requested by a user. If the cache contains such an image, the remote system could display the cached image rather than sending a new request to the imaging system. Such operation could reduce the bandwidth cost to operate the remote system while minimally increasing the storage requirements of the remote system.

The imager of the system 100 could include a variety of components to facilitate a variety of different volumetric imaging modalities. In some examples, the imager could include high-power magnets (e.g., superconducting magnets), bias coils, radiofrequency scan coils, and other elements configured to perform magnetic resonance imaging (MRI) of the sample. Such an MRI imager could generate volumetric density information for the target sample related to the density of hydrogen atoms, MRI contrast medium atoms (e.g., Gadolinium), or related to the density of some other magnetic particle. In some examples, the imager could include a micro-CT imager configured to generate volumetric density information for the target sample related to the X-ray radiodensity or radiopacity of the sample.

Such a micro-CT imager includes at least one X-ray source, capable of generating X-rays, and at least one X-ray imager, capable of generating images of the emitted X-rays after having passed through the target sample. Higher-density regions of the target sample (which may alternatively be referred to as regions having higher X-ray radiodensity or radiopacity) will absorb and/or scatter the emitted X-rays to a greater degree, resulting in corresponding regions of the X-ray imager being exposed to a lower intensity of X-rays. A micro-CT imager operates to generate scan data in the form of a plurality of X-ray images of a target sample, each image taken at a respective angle and/or location relative to the target sample. The plurality of X-ray images of a target sample can then be reconstructed to generate volumetric density information for the target sample.

The X-ray source could include an X-ray tube, a cyclotron, a synchrotron, a radioactive X-ray source, or some other source of X-rays. The X-ray source could include multiple different sources of X-rays, e.g., to permit modulation of the beam power, beam width, the direction of the X-ray beam relative to a target sample, a focus or divergence of the X-ray beam at the location of a target sample, or to allow control of some other property of the emitted X-rays so as to facilitate imaging of a target sample.

The X-ray imager could include a photostimulable phosphor plate, scintillator, X-ray intensifier, or other element to convert X-rays into visible light coupled to a charge-coupled device, array of photodetectors, flat-panel detectors, or other visible-light imaging element(s). Additionally or alternatively, the X-ray imager could include an amorphous selenium element or some other element configured to convert X-rays directly into electron-hole pairs or other electronically-detectable phenomena. The X-ray imager and X-ray source together define a field of view, which is a region that the micro-CT imager can image. Thus, the micro-CT imager can generate an X-ray image of portions of a target sample (or other substances or structures) that are located within the field of view.

Micro-CT imaging of samples that have been removed from a body allows for the use of higher-intensity and longer-duration scans than would be possible when imaging parts of a living patient's body. Additionally, the X-ray source and X-ray imager can be located closer to the sample. These factors contribute to increased image resolution and contrast when compared to imaging tissues located within a patient's body. Further, the location and orientation of an explanted tissue sample can be arbitrarily rotated and/or translated by an actuated gantry, allowing the exact location and orientation of the sample relative to the imaging apparatus to be arbitrarily and precisely controlled. For example, X-ray images can be taken of the sample at non-uniform angles or some other reduced or sparse set of angles. Additionally, when the entire sample is small enough to fit entirely within the field of view of the imaging apparatus, the actuated gantry can be operated to ensure that the sample is, in fact, located entirely within the field of view. In some examples, a sample receptacle configured to contain the sample could have a size that is approximately coextensive with the field of view, ensuring that any sample deposited therein will remain entirely within the field of view. Alternatively, when the sample is too large to fit entirely within the field of view, the location and orientation of the sample can be controlled to obtain X-ray images at specific relative locations and orientations sufficient to allow reconstruction of volumetric density information for the entire sample.

Imaging of explanted tissue samples also allows the X-ray source to be entirely enclosed within X-ray shielding material (e.g., lead sheeting) when the X-ray source is being operated to emit X-rays. For example, a door composed of X-ray shielding material could be translated and/or rotated into place after the sample has been deposited within the micro-CT imager, reducing the amount of X-ray exposure experienced by surgeons, nurses, or other persons in proximity to the imager. This can also allow the intensity of X-rays emitted by the X-ray source to be increased while maintaining environmental exposure limits below a specified safe level, potentially increasing image resolution and/or contrast.

Figure 2A:
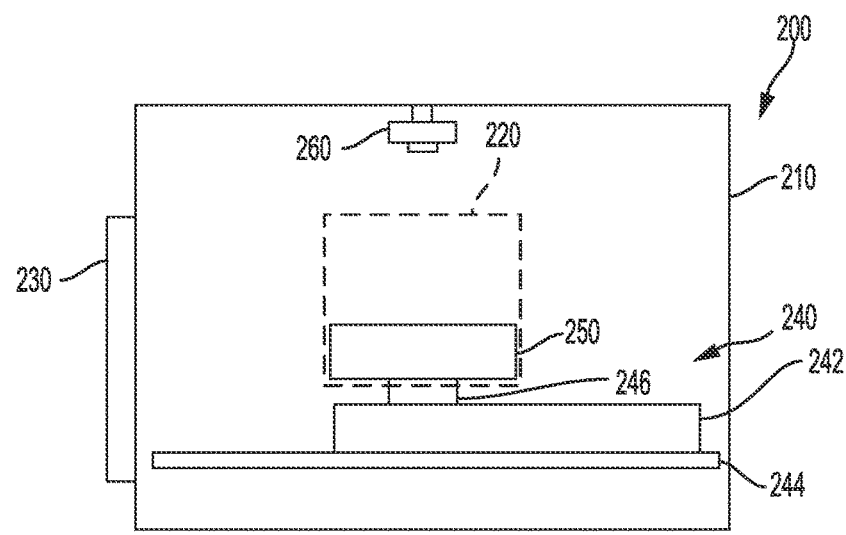
FIG. 2A depicts elements of an example imaging system.
Figure 2B:
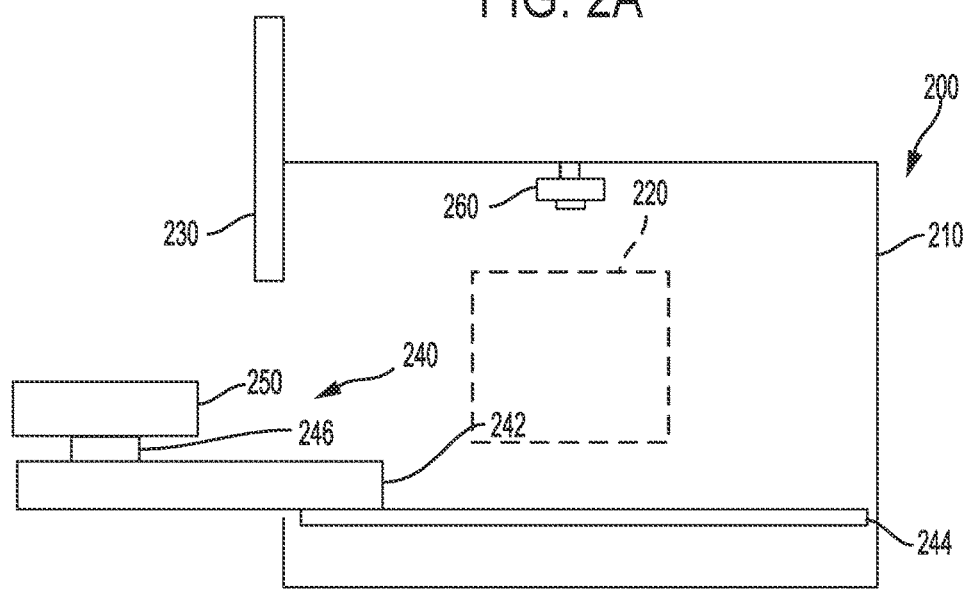
FIG. 2B depicts elements of the example imaging system of FIG. 2A.

FIGS. 2A and 2B show, in cross-sectional schematic view, elements of a micro-CT imager 200. The imager includes a shield 210 composed of a radiopaque material (e.g., lead or some other metal). Within the shield 210 are an X-ray source and an X-ray imager (not shown) that, together, define a field of view 220 within which the imager 200 can generate X-ray images of samples or portions of samples. A sample receptacle 250 is configured to contain a target sample and is mechanically coupled to a gantry 240. The gantry 240 includes a linear actuator 242 that is operable to translate the sample receptacle 250 horizontally, to facilitate loading and unloading of the sample and to allow for automated control of the location of the sample receptacle 250 relative to the field of view 220. The linear actuator 242 moves against a rail 244. The gantry 240 also includes a rotary actuator 246 to control the orientation of the sample receptacle 250 relative to the imager 200 in order to facilitate scanning target samples contained within the sample receptacle 250. FIG. 2A shows the imager 200 in a configuration to image a target sample contained within the sample receptacle 250 and FIG. 2B shows the imager 200 in a configuration to load or unload the target sample into/from the sample receptacle 250.

The imager 200 also includes a door 230 that is composed of a radiopaque material (e.g., lead or some other metal) and that can be translated and/or rotated between a closed position (shown in FIG. 2A) and an open position (shown in FIG. 2B). In the open position, the door 230 permits the gantry to extend the sample receptacle 250 outside of the shield 210 to allow for sample loading/unloading. In the closed position, the door 230 reduces the amount of X-rays that are emitted into the environment of the imager 200 when the imager 200 is generating X-rays to scan a sample. The door 230 could be manually opened and closed or could be automatically opened and closed using one or more linear and/or rotary actuators (not shown).

The imager 200 also includes a visible-light camera 260 for viewing a sample during a scan. This can allow a user to inspect the presence, location, and condition of the sample, as well as the process of an ongoing scan without opening the door 230 (and thus delaying the scan and/or increasing X-ray exposure) or requiring the presence of a visible-light transparent but X-ray opaque window.

Figure 3:
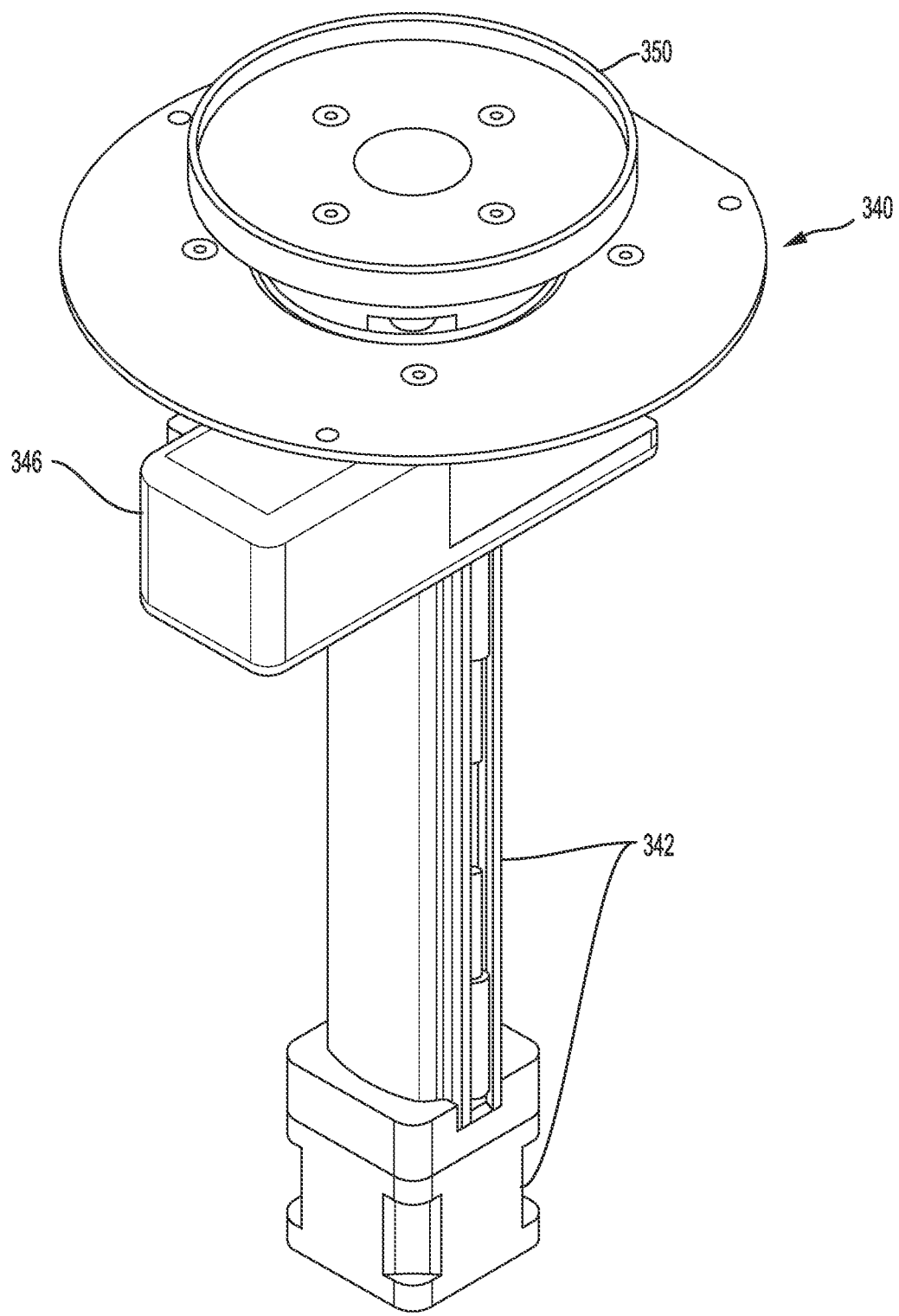
FIG. 3 depicts elements of an example imaging system.

The gantry 240 is configured to translate a sample receptacle 250 in a direction perpendicular to an axis of rotation of the sample receptacle 250. This is intended as a non-limiting illustrative example embodiment. FIG. 3 illustrates elements of an alternative gantry 340 that is configured to translate a sample receptacle 350 along a direction (a vertical direction, in FIG. 3) parallel to an axis of rotation of the sample receptacle 350. A rotary actuator 346 rotates the sample receptacle 350 while a linear actuator 342 controls the vertical location of the sample receptacle 350, e.g., to move the sample receptacle between a field of view of an imager and a sample loading location that is located outside of a shield or other housing of the imager.

A micro-CT imager (e.g., imager 200) of a system as described herein could be operated in a variety of ways to generate X-ray scan data of a sample sufficient to generate an accurate reconstruction of volumetric density information for the sample. The reconstruction methods described in U.S. Pat. No. 8,605,975, U.S. application no. 2014/0161332, U.S. Pat. Nos. 9,189,871, 9,613,442, PCT application no. US18/52175, and U.S. Provisional Patent Application No. 62/562,138 allow for accurate reconstruction of such volumetric density information using a reduced number of X-ray images of a sample relative to other methods. In particular, the reduced view and sparse view reconstruction methods described in those patents and patent applications, permit the generation of clinical-quality volumetric density information for explanted breast tissue or other target tissue sample using less than 300 individual X-ray images of the sample, or less than 100 individual X-ray images of the sample. This reduction in the number of X-ray images needed for reconstruction can lead to a reduction in the overall scan time to less than ten minutes, or less than 5 minutes. Such a reduction in scan time is especially valuable in the intraoperative applications made possible by the embodiments described herein.

Additionally, these reduced view and sparse view reconstruction methods can utilize X-ray images of a sample that are not uniformly spaced with respect to the angle of the images relative to the sample, permitting particular areas of the sample to be reconstructed with higher accuracy and/or resolution. Such reduced view and sparse view reconstruction methods can also be applied to reconstruct short-scan sets of images, which includes X-ray images of a sample at a set of angles that span less than 300 degrees. For example, a sparse-view short scan reconstruction of volumetric density information for a sample could be generated from a set of fewer than 150 X-ray images of a sample and that correspond to respective views of the sample at angles that span less than 200 degrees.

These reduced view and sparse view reconstruction methods also allow for reconstruction based on individual X-ray images of a sample that do not depict all of the sample. That is, a sample that is larger than a field of view of an imager could be reconstructed from a set of images that provide image data for all of the sample but that, individually, may only depict portions of the sample. Imaging a sample in such a manner may be referred to as an 'offset detector' scanning modality. The use of such an offset detector modality allows the size of samples that are able to be imaged by a particular imager to be increased. For example, an imager could be configured to generate volumetric density information for a target sample having a largest dimension (e.g., a length of a long tissue sample) that is greater than a largest dimension of a field of view of the imager. For example, the largest dimension of the target sample could be more than 5 centimeters greater than the largest dimension of the field of view (e.g., the target sample could have a largest dimension greater than 15 centimeters and the field of view of the imager could have a largest dimension that is less than 10 centimeters). In another example, the largest dimension of the target sample could be more than 20% greater than the largest dimension of the field of view. Additionally or alternatively, the cost, size, reliability, or other properties of an imager configured to image samples of a specified size could be reduced by operating in such an offset detector mode, thereby allowing the size of the X-ray imager to be reduced.

Figure 2C:
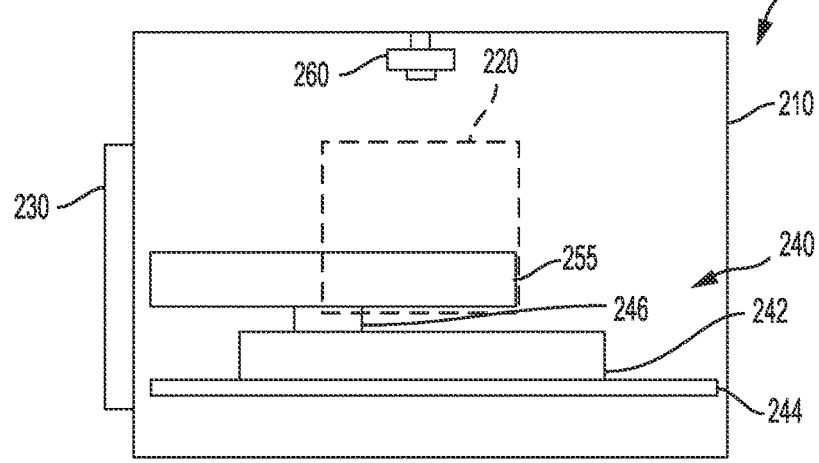
FIG. 2C depicts elements of the example imaging system of FIG. 2A.

The use of a linear actuator for loading and unloading samples facilitates the use of such an offset detector imaging modality, or the use of offset-detector and non-offset-detector modalities as required. FIG. 2C shows the imager 200 with an alternative, larger sample receptacle 255 coupled to the gantry 240. The sample receptacles 250, 255 could be removably coupled to the gantry 240 (e.g., via clips, formed detents, magnets, etc.), facilitating user selection and use of an appropriate-sized receptacle for each sample to be imaged. As shown in FIG. 2C, only a portion of the larger sample receptacle 255 is disposed within the field of view 220, and so it may be that only a portion of a sample contained therein (not shown) is imaged. Conversely, FIG. 2A shows that the sample receptacle 250 is entirely contained within the field of view 220, and thus the entirety of a sample contained therein (not shown) may be represented in a single X-ray image.

A user may command the imager 200 to operate in a particular mode (e.g., offset detector mode) according to the size of sample to be imaged or based on other factors. Additionally or alternatively, the imager 200 could operate to determine which mode to use to scan a sample. For example, RFID, an embedded identification IC, a QR code, or some other aspect of the sample receptacle 250, 255 could indicate the size of the sample receptacle (e.g., that the receptacle is capable of being located entirely within the field of view 220 or that it is larger than the field of view 220 by a specified amount) and the imager 200 could operate accordingly (e.g., in offset detector mode if the receptacle 255 is larger than the field of view 220).

The use of such an 'offset' scanning mode can provide a variety of benefits. For example, such a mode can allow for imaging of samples larger than the field of view of an imager. Additionally or alternatively, the field of view necessary to image a sample of a specified size could be reduced, thereby reducing system cost, increasing system resiliency and lifetime, and/or increasing the usable X-ray intensity.

An imaging system as described herein can be configured to create volumetric density information for a sample using a micro-CT imager or other X-ray based tomographic technology. However, such an imaging system could include additional or alternative imaging technologies, e.g., magnetic resonance imaging, volumetric fluorescence imaging, ultrasound imaging, far-ultraviolet imaging, spontaneous emission imaging (e.g., positron-emission imaging), or some other form of volumetric imaging, or some combination of modalities. Indeed, the precise automated specimen handling described herein (e.g., in relation to various gantry embodiments configured to move and/or orient a sample relative to a field of view of a micro-CT imager) could facilitate the automated imaging of a sample using multiple imaging modalities. The lack of human intervention in the sample handling between imaging modalities could improve registration of data from multiple different imaging modalities by reducing the amount of sample motion or deformation that may occur between performance of the multiple different imaging modalities.

III. Example Visualizations of Reconstructed Sample Data

A variety of different methods could be used to generate volumetric density information for a tissue sample. For example, a micro-CT imager can be used to generate X-ray radiopacity density information, an MRI imager can be used to generate hydrogen atom or MRI contrast density information, etc. In order to use such volumetric density information to, e.g., inform the conclusion of a tumor resection surgery, to inform a location of a patient's body from which to excise additional tissue, etc. it is generally advantageous to render, from the volumetric density information, one or more two-dimensional images of the sample. Such two-dimensional images can include high-resolution cross-sectional images of slices through the sample, e.g., slices through the sample that are parallel to the standard coronal, sagittal, and/or transverse planes of the sample according to the orientation of the sample within a patient's body. Two-dimensional images can also include perspective views of the sample. Such perspective views could be useful to illustrate the orientation and location of high-resolution cross-sectional images relative to the sample. Additionally, such perspective views may show, in three-dimensional space, the location of tumors, staples, wires, or other substances or structures of interest within the tissue sample.

Standard radiology workstations often provide this information in a four-pane interface, with a first pane providing a perspective view of the sample and the other three panes providing cross-sectional views through the sample parallel to the coronal, sagittal, and transverse planes, respectively. This can be beneficial in providing the radiologist with maximal information for assessing whether a tumor or other target tissue has been fully excised, or if that target tissue likely has not (e.g., due to the target tissue extending to, or proximate to, a margin of the explanted tissue sample). Such an information-rich display is possible because the radiologist's reading room or other workspace is not likely to be space-limited, and the radiologist is unlikely to be moving between the workstation and other tasks.

In contrast, a surgeon's workspace is more constrained, with it being disadvantageous for a display to be large or proximate to the operating table. Additionally, the surgeon is less likely to be performing an actual analysis of the image data. Rather, the surgeon is likely to act based on an analysis performed automatically (e.g., by segmentation algorithms configured to detect the location, shape, and extent of cancerous tissue within a sample) and/or an analysis performed by a radiologist or other medical imaging specialist. In such an example, the display provided to the surgeon should be focused on quickly and clearly communicating to the surgeon whether a target tissue (e.g., tumor) has been fully excised, and if not, where along the margin of the removed tissue the surgeon should remove additional tissue. It is also important that the surgeon is able to accurately correspond any instructions from the radiologist (e.g., as regards locations within the patient's body for additional tissue removal) to the patient's body.

The user interface embodiments described herein provide a variety of improvements directed toward providing useful information to a surgeon in an intuitive manner as well as facilitating accurate, fast communication between a radiologist and surgeon. These embodiments include improved user interfaces to assist in analyzing and displaying volumetric data. In some examples, a user interface is provided by a computing system (e.g., an imaging system) that operates an imager to generate scan data for a sample, that reconstructs volumetric density information from the scan data, and that renders two-dimensional images and/or generates other analyses based on the volumetric density information. However, such improved user interfaces can also be provided by a radiologist's workstation, a remote control and display unit for an imaging system, or some other interface system that does not operate to reconstruct volumetric density information for a sample or to render two-dimensional images therefrom.

In such an interface system, updating the image(s) provided to a user may include the system transmitting a request for new image data to an imaging and/or reconstruction system and receiving image data in response to that request. For example, in response to a user command to switch from one image plane to another, to change a location within the sample of a displayed cross-sectional image, to rotate a perspective view of a sample, to show or hide contents of the sample in a perspective or other view, or to provide some other imagery to the user, the radiologist's workstation 170 could transmit a request to the imaging system 110 for a view of the volumetric density information through a particular point, at particular angle, or other particular cross-sectional view of a target sample. The imaging system 110 could then, in response to that request, render the requested image data and send an indication thereof to the radiologist's workstation 170.

Figure 4A:
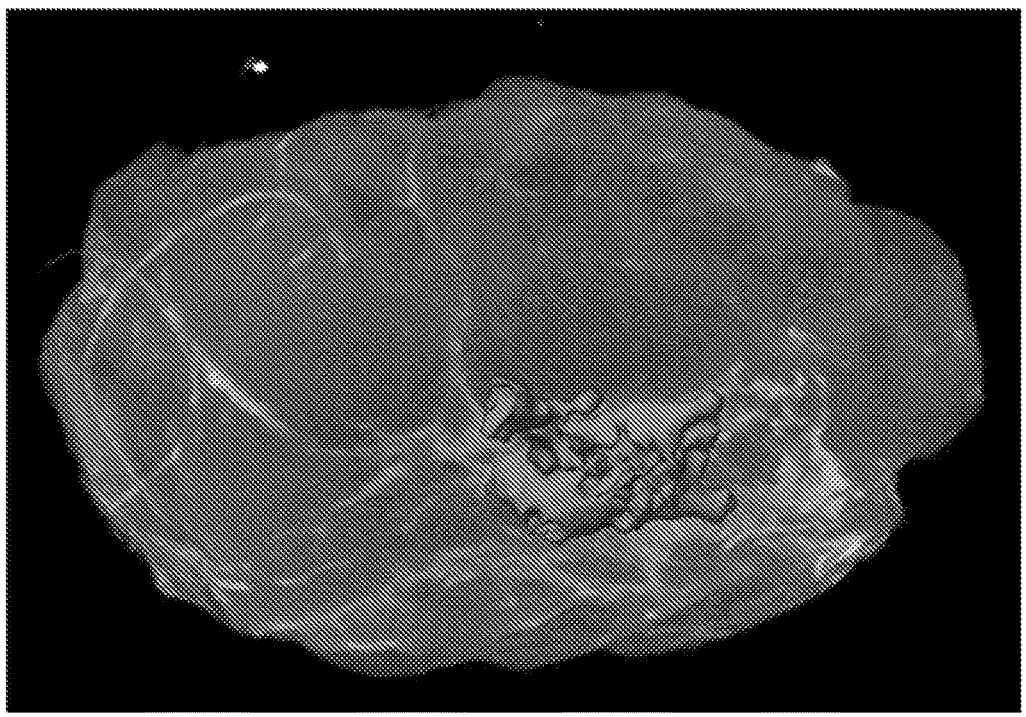
FIG. 4A depicts an example display of volumetric data related to a target sample.

In a first example embodiment, a perspective view of the sample (e.g., a perspective representation of volumetric density information for the sample) can be provided with the location and extent of a tumor or other volume of interest indicated. This is illustrated in FIG. 4A, which shows a three-dimensional render of a segmentation map of a tumor within a sample superimposed on a perspective view of the sample. As shown in FIG. 4, the perspective view of the sample includes a projection of the volumetric density information, however, alternative perspective representations of a sample are possible. For example, the perspective representation of the sample could include a render of an outside surface of the sample, with the shape of the outside surface determined from the volumetric density information for the sample.

A segmentation map for tumors, staples, or other contents of interest within a sample could be generated in a variety of ways. In some examples, an automated algorithm could generate the segmentation map. This could include applying a density threshold to the volumetric density information (e.g., to segment staples, wire, or other high-density content within the sample), applying a trained neural network, or performing some other process on the volumetric density information. In some examples, the segmentation map could be generated by a radiologist. For example, the radiologist could annotate the extent of a tumor or other structure of interest within a tissue sample by, e.g., indicating the extent of the structure of interest in one or more two-dimensional cross-sectional images of the sample. A radiologist could be augmented by one or more automated segmentation methods. For example, an automated method could generate an estimated segmentation map which the radiologist could then edit (e.g., by dragging the edges of the segmentation map to expand or contract the volume of the sample that is included within the segmentation map). In another example, an automated method could generate a number of possible segmentations, and a radiologist could select the 'best' one.

Figure 4B:
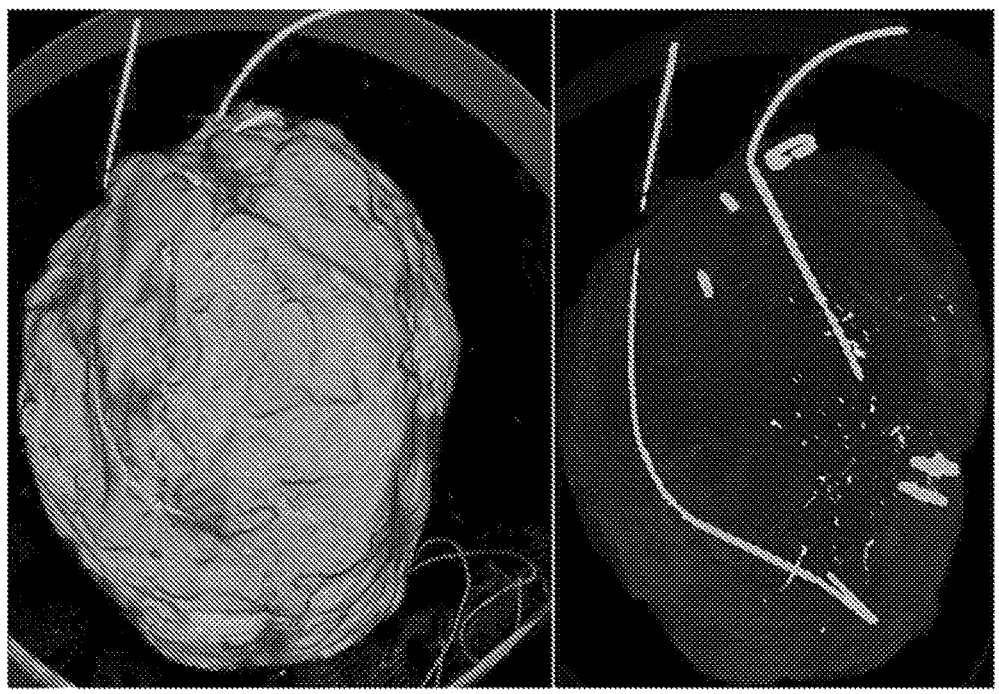
FIG. 4B depicts an example display of volumetric data related to a target sample.

Multiple different tumors, staples, wires, or other objects or sets of objects within a sample could be associated with respective different segmentation maps. A user interface could then provide a user with the ability to selectively blank certain contents of the sample from view by selecting or de-selecting the corresponding segmentation maps. FIG. 4B shows an example of such functionality. On the left, FIG. 4B shows a perspective view (a three-dimensional rendering) of contents of a sample. The contents include a number of metal staples, wires, and other objects that have been added to the sample (e.g., to facilitate orientation of the sample relative to a patient's body). On the right, FIG. 4B shows a perspective view of only the metal objects and calcifications within the tissue (omitting, among other things, the soft tissues having densities less than the density of the calcifications). A user selecting or deselecting individual objects or other contents within a sample for display in the manner could include clicking on or otherwise interacting with buttons of a user interface that are associated with respective contents of the sample, clicking on or otherwise interacting with portions of a display that are displaying contents of the sample, or interacting with a user interface in some other manner.

Figure 5:
FIG. 5 depicts an example display of volumetric data related to a target sample.

It can be advantageous to color-code the surface of a displayed segmentation map according to the distance of portions of the segmentation map to the nearest margin of the tissue sample. Such a display has the benefit of quickly and intuitively indicating to a surgeon where the target tissue is more (or less) likely to extend beyond the margin of the removed tissue and thus to remain, in part, within a patient's body. This is illustrated in FIG. 5, which shows a color-coded perspective view of a segmentation map of a tumor superimposed within a render of the outside surface of the sample that contains the tumor. Such a color coding can be determined, for each point on the surface of the segmentation map, by determining the respective distance to a respective nearest point on the determined outside surface of the target sample. This could be done after a radiologist (or other healthcare professional) has created, updated, or modified the segmentation map.

It can be advantageous to colorize the outside of a three-dimensional rendering of a sample so that it superficially resembles the visual-light appearance of the sample. Such coloring can improve a radiologist's intuition about the orientation and composition of the sample and aide them interacting with imaging data related to the sample. However, it can be difficult to generate visible-light imagery of the outside surface of a sample and then to register that imagery with the volumetric density information generated from the sample. Instead, a method can be used that uses the density information of the sample near the surface to inform the coloration of the outside surface of the sample when represented in a perspective view. Lower-density areas of the volumetric density information can result in darker-colored areas of the outside surface (e.g., dark pink, orange, yellow, or red), while higher-density areas of the volumetric density information can result in lighter-colored areas of the outside surface (e.g., white. light pink, light yellow, or light orange). This approximates the relationship between the color of common explanted tissue samples and their X-ray density. The difference between the color of the high-density regions and the color of the low-density regions could be less than 5%. Especially high-density areas of the volumetric density information, which likely correspond to metal staples, wires, or other artificial elements inserted into the sample, can result in a specified color, e.g., white or gray, to indicate the presence of a high-density artificial object in the sample.

Figure 6A:
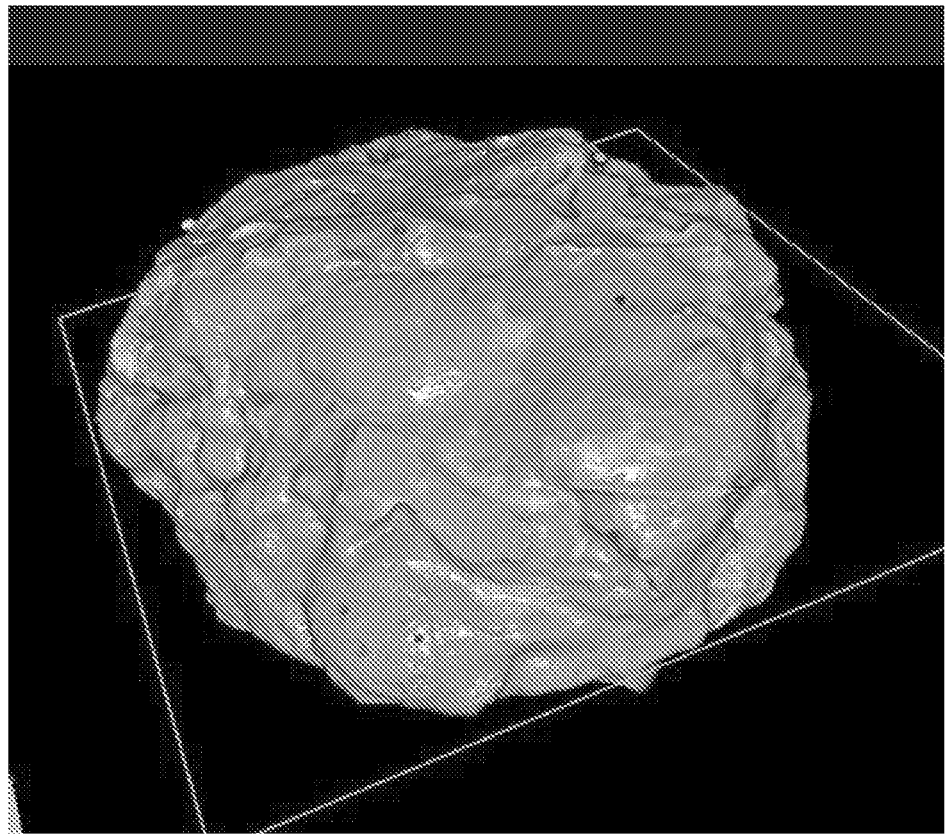
FIG. 6A depicts an example display of volumetric data related to a target sample.

An example of such a surface color-coding is illustrated in FIG. 6A. The mapping between density and surface coloration could be a linear function or a nonlinear function. For example, determining a color for the particular point on the outside surface of a sample could include linearly or nonlinearly mapping the density of a portion of the volumetric density information that is proximate to the particular point to a range of colors. The density-to-color mapping could be based on a piecewise function. For example, a first range of densities (e.g., a range of densities corresponding to the density of soft tissues in a sample) could be mapped linearly across a range of colors (e.g., light orange to white) while densities greater than the first range of densities (e.g., densities corresponding to stapled, wires, or other metallic or other high-density non-tissue substances) are mapped to a single color (e.g., grey). The mapping of densities to colors could be normalized, e.g., to a histogram or other percentile determination of densities represented within a set of volumetric density information for a sample. For example, a range of densities from the 25% to the 75% of densities within a sample could be mapped linearly (or nonlinearly) to a first range of colors (e.g., light red to white) while densities above the 75% could be mapped to grey or to some other color indicative of staples, wires, or other metallic or otherwise non-organic materials.

In practice, a surgeon may insert wires, sutures, staples, or other artifacts to indicate the orientation of a sample, or may add ink to the surface of the sample to indicate orientation. However, these methods may still result in the radiologist and surgeon having different understandings of the orientation of the sample. Such a difference can result in poorer surgical outcomes; if the radiologist and surgeon differ with respect to their understandings of the orientation of a sample, the radiologist's recommendations may not be interpreted by the surgeon correctly and may result in rescission of additional tissue from the wrong location within a patient's body.

Figure 6B:
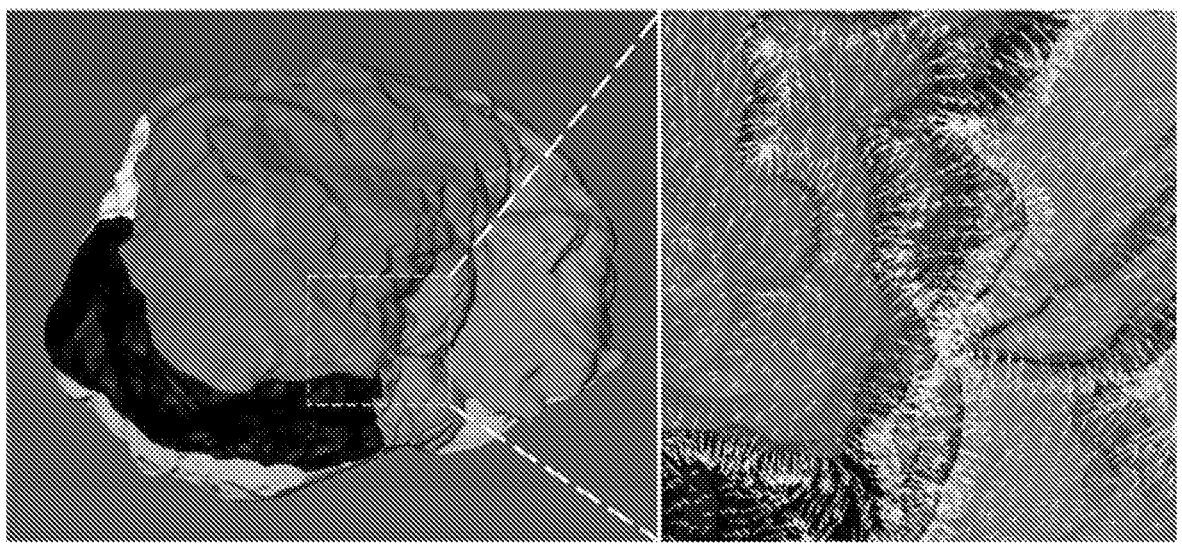
FIG. 6B depicts an example display of volumetric data related to a target sample.

Thus, it can be advantageous to colorize the outside of a three-dimensional rendering of a sample based on a surgeon's understanding of the orientation of the sample. Providing such a colorization to a radiologist can improve the radiologist's understanding of the sample's orientation so that any recommendations made by the radiologist are more likely to result in the surgeon taking the correct action. An example of such a surface color-coding is illustrated in FIG. 6B. Each of the six cardinal directions in three-dimensional space (anterior, posterior, medial, lateral, ventral, and dorsal) corresponds to a respective color. Such 'virtual inking' can also assist a pathologist in physically inking the imaged sample in a manner that more accurately corresponds to the actual orientation of the sample within a patient's body.

Orientation-based colorization of an outside surface of a target sample could be performed in a variety of ways. For example, a surface normal could be determined for a plurality of locations on the outside surface and the surface normals then used to determine the color-coding of the outside surface. This could include mapping the surface normals to colors according to which of the cardinal directions they are closest to, and then performing hole-filling, region-expanding, or other filtering techniques to generate a final surface coloring. Additionally or alternatively, a surgeon could virtually 'paint' the surface manually, or manually modify an automatically-generated surface coloration. The surgeon could set or modify the orientation of the volumetric density information relative to a three-dimensional space, and the surface coloration could be generated or re-generated based on the relative orientation. This surface coloration, which now corresponds to the surgeon's understanding of the orientation of the sample, could then be provided to a radiologist so as to ensure that the radiologist and surgeon are operating from the same understanding of the orientation of the sample.

Figure 7:
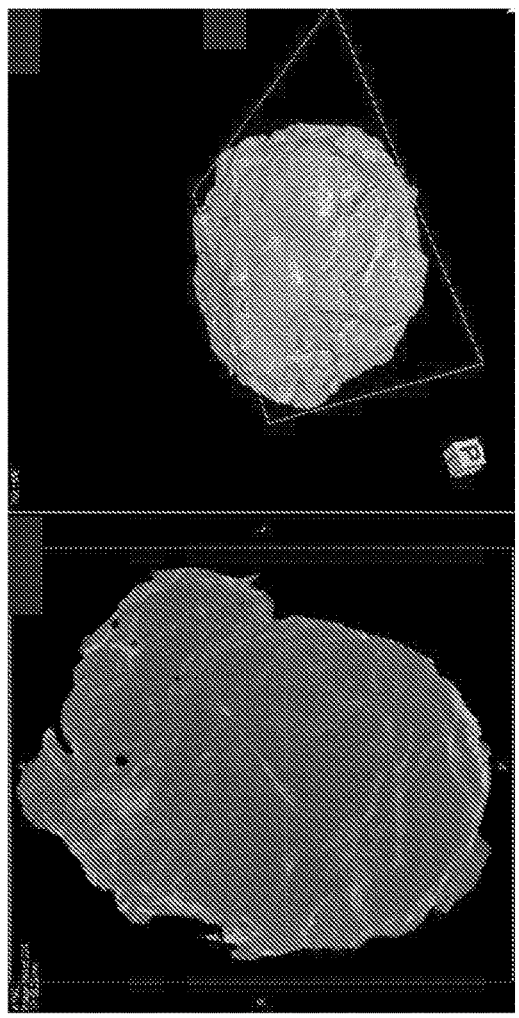
FIG. 7 depicts elements of an example user interface for displaying multiple views of volumetric data related to a target sample.

To improve clinical outcomes, an improved user interface is provided for presenting imaging data to a surgeon in a concise, informative, and easy-to-use fashion. FIG. 7 illustrates, by way of example, features of this improved user interface. The user interface has two primary panes, with the right pane providing a perspective representation of the volumetric density information for a sample (a simulated color render of the outside surface of the sample) and the left pane providing a high-resolution two-dimensional image of the sample according to a cross-sectional view through a specified view point within the sample and orthogonal to a first axis in a three-dimensional space. The three-dimensional space represents the orientation of the sample relative to a patient's body, and can be adjusted by the user (as described in greater detail below).

Figure 8A:
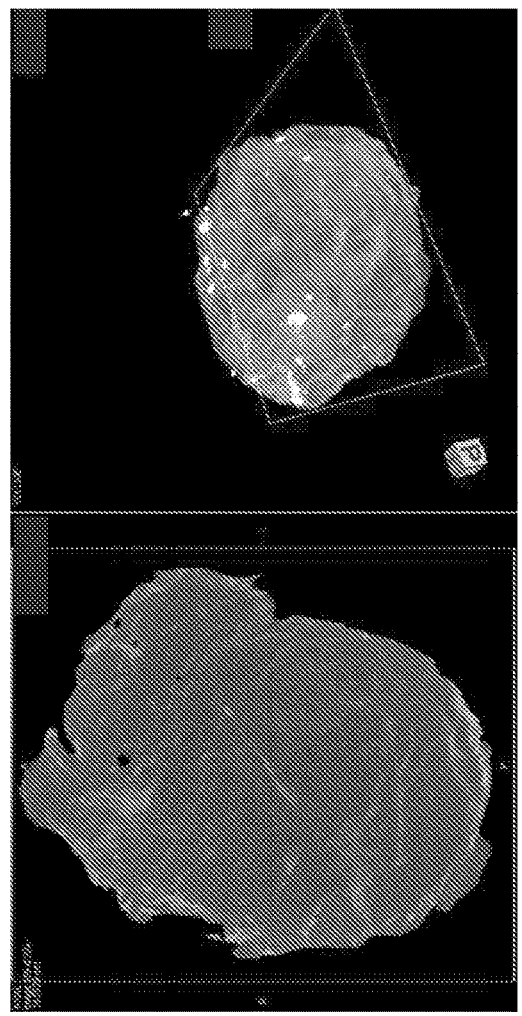
FIG. 8A depicts elements of an example user interface for displaying multiple views of volumetric data related to a target sample.

The particular perspective view of the sample provided in the right pane can be controlled by a user in a variety of ways. For example, a user could click and drag to rotate the perspective view about an axis, or use a two-finger gesture to zoom in or out. Alternatively, buttons arranged as a quartet of directional arrows or some other user interface element (not shown) could be used to accomplish such changes. The type of perspective view (e.g., surface coloration according to orientation, projected density view with internal structures indicated, etc.) could be modified by pressing buttons on the user interface, engaging a dropdown menu, or by some other means. For example, the user interface could be used (e.g., by clicking or otherwise interacting with a button, not shown) to switch between the simulated surface render view depicted in FIG. 7 to a maximum-density projection view, as depicted in FIG. 8A.

Figure 8B:
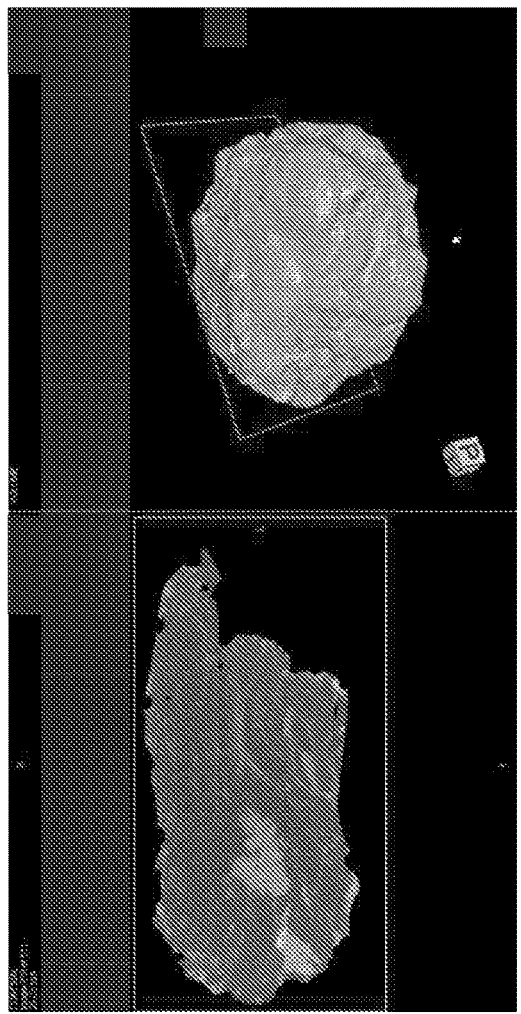
FIG. 8B depicts elements of an example user interface for displaying multiple views of volumetric data related to a target sample.

The location of the specified view point and the orientation of the two-dimensional image provided in the left pane can be controlled by a user in a variety of ways. For example, the plane of the image could be changed between the three major anatomical planes by pressing buttons on the interface. The location of the view point within the sample could be modified by pressing buttons (not shown), by clicking points of interest on the perspective view, or by engaging in some other control behavior. For example, the user interface could be used (e.g., by clicking or otherwise interacting with a button, not shown) to switch between a view through a first anatomical plane (e.g., the axial plane), as depicted in FIG. 7, to through a second anatomical plane (e.g., the coronal plane), as depicted in FIG. 8B.

Figure 8C:
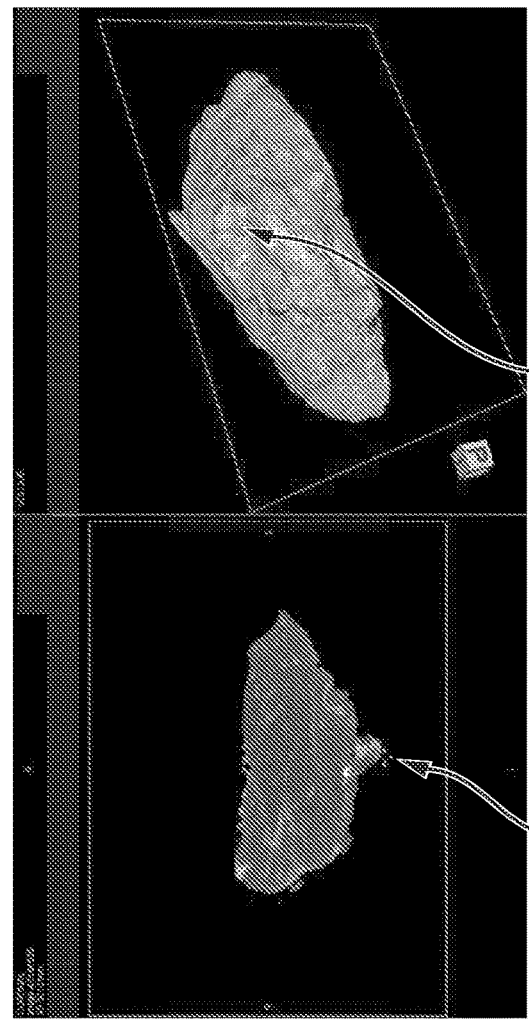
FIG. 8C depicts elements of an example user interface for displaying multiple views of volumetric data related to a target sample.

The orientation of the volumetric density information relative to the three-dimensional space can be adjusted by the user by clicking or otherwise interacting with a user interface a button (e.g., a "re-orienter" button, not shown) and then dragging the perspective view until the orientation of the sample, as shown in the perspective view, matches the user's desired orientation. Once such a re-orientation has occurred, the cross-sectional image shown in the left pane could be updated to correspond to the change in orientation (e.g., so that the two-dimensional image in the left pane corresponds to one of the three principal anatomical planes according to the updated three-dimensional space). This is illustrated, by way of example, in FIG. 8C, which depicts updates to the display of FIG. 8B following such a re-orientation. The updated orientation could also result in updates in other displays, e.g., updated two-dimensional cross-sectional images presented to a radiologist using another system, updated surface coloration of a perspective view of the sample to reflect the change in the orientation of the three-dimensional space relative to the sample, or updating some other display or system.

A user indicating a point in the cross-sectional view could result in the location of the indicated point, within the three-dimensional space of the sample, being indicated in the perspective view of the sample. This is illustrated by way of example in FIG. 8C. A user has indicated a point of interest 810 within the cross-sectional view of the left pane and the location of the indicated point, within the perspective view of the right pane, has been indicated 840. The location of this indicated point in the three-dimensional space can be updated as the user rotates the perspective view, zooms the perspective view, or otherwise causes the perspective view to change.

The location, relative to the sample, of the view point through which the left pane displays a cross-sectional image may be controlled in a variety of ways. The view point could be moved in a direction perpendicular to the plane of the image by clicking buttons on the user interface, by dragging the left pane (e.g., dragging upward resulting in movement of the view point 'toward' the user, dragging downward resulting in movement of the view point 'away from' the user), or by interacting with the left pane in some other manner. In some examples, a user could indicate a point of interest on the perspective view of a sample in the right pane, and this could result in the location of the view point changing to the indicated point of interest. For example, if the user clicked on a region that contains a calcification or other increased-density region or object, the view point could be changed to correspond to the location of the calcification.

Figure 8D:
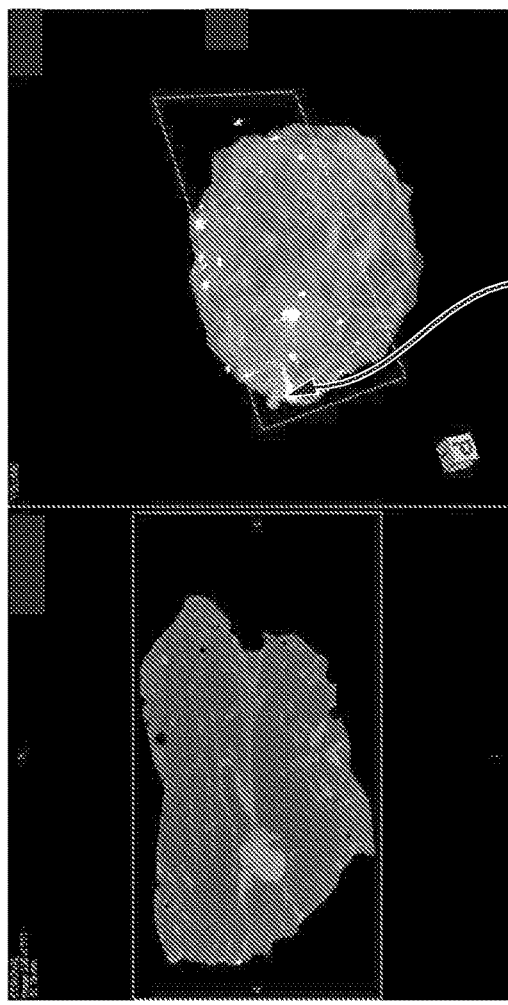
FIG. 8D depicts elements of an example user interface for displaying multiple views of volumetric data related to a target sample.
Figure 8E:
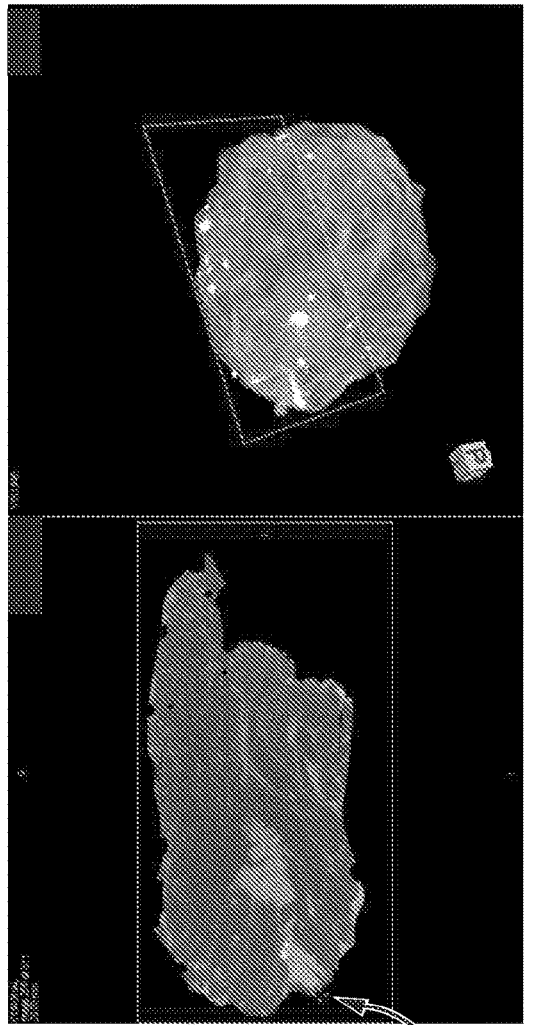
FIG. 8E depicts elements of an example user interface for displaying multiple views of volumetric data related to a target sample.

This is illustrated by way of example in FIGS. 8D and 8E. In FIG. 8D, a user has indicated a point of interest 830 within the perspective representation of the sample. In response, the left pane view has changed, In FIG. 8E, to provide a cross-sectional view through an updated view point corresponding to the point of interest. Additionally, the location of the updated view point, within the updated cross-sectional image, has been indicated 840 in the left pane display A variety of methods could be used to determine the location of the updated view point based on such a user input. In some examples, the location of a highest-density region within the sample and proximate to the region indicated by the user input could be determined. This could include (i) receiving, via the user interface, an indication of the point of interest within the perspective representation of the volumetric density information, (ii) determining, based on the indicated point on the display, a corresponding columnar portion of the volumetric density information; and (iii) determining the location, within the three dimensional space, of the point of interest by determining the location of a maximal-density region within the columnar portion of the volumetric density information.

Note that the description of certain user interactions and/or display of certain information as corresponding to a 'left pane' or a 'right pane' of a user interface is intended to illustrate non-limiting example embodiments. Such functionality could be distributed oppositely, or, indeed, to 'upper' and 'lower' panes of a two-pane interface. Further, one of skill in the art will appreciate that many of the display modalities, visualizations, and user interface functions described above may be applied to user interfaces having more than two panes, e.g., to a traditional four-pane radiologist's workstation user interface.

IV. Example Systems

Computational functions (e.g., functions to operate an imager to generate can data for a target sample, functions to reconstruct volumetric density information from such scan data, functions to render cross-sectional, perspective, or other two-dimensional views from the volumetric density data, user interface functions) described herein may be performed by one or more computing systems. Such a computing system may be integrated into or take the form of a computing device, such as a portable medical imaging system, a remote interface for such an imaging system, a radiologist's workstation, a tablet computer, a laptop computer, a server, a cloud computing network, and/or a programmable logic controller. For purposes of example, FIG. 9 is a simplified block diagram showing some of the components of an example computing device 900 that may include imaging components 924. Imaging components 924 may include a micro-CT imager, an MRI imager, and/or some other components configured to provide information indicative of volumetric density information for a sample. Alternatively, an example computing device may lack such components and receive scan information via some other means (e.g., via the internet or some other network or other communications interface).

As shown in FIG. 9, computing device 900 may include a communication interface 902, a user interface 904, a processor 906, data storage 908, and imaging components 924, all of which may be communicatively linked together by a system bus, network, or other connection mechanism 910.

Communication interface 902 may function to allow computing device 900 to communicate, using analog or digital modulation of electric, magnetic, electromagnetic, optical, or other signals, with other devices, access networks, and/or transport networks. Thus, communication interface 902 may facilitate circuit-switched and/or packet-switched communication, such as plain old telephone service (POTS) communication and/or Internet protocol (IP) or other packetized communication. For instance, communication interface 902 may include a chipset and antenna arranged for wireless communication with a radio access network or an access point. Also, communication interface 902 may take the form of or include a wireline interface, such as an Ethernet, Universal Serial Bus (USB), or High-Definition Multimedia Interface (HDMI) port. Communication interface 902 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 902. Furthermore, communication interface 902 may comprise multiple physical communication interfaces (e.g., a Wifi interface, a BLUETOOTH® interface, and a wide-area wireless interface).

In some embodiments, communication interface 902 may function to allow computing device 900 to communicate, with other devices, remote servers, access networks, and/or transport networks. For example, the communication interface 902 may function to transmit and/or receive an indication of image information, to transmit an indication of an image that has be generated using the methods described herein, or some other information. For example, the computing device 900 could be a portable intra-operative imaging system and the remote system could be a computer, server, cloud computing system, or other system configured to perform the methods described herein.

User interface 904 may function to allow computing device 900 to interact with a user, for example to receive input from and/or to provide output to the user. Thus, user interface 904 may include input components such as a keypad, keyboard, touch-sensitive or presence-sensitive panel, computer mouse, trackball, joystick, microphone, and so on. User interface 904 may also include one or more output components such as a display screen which, for example, may be combined with a presence-sensitive panel. The display screen may be based on CRT, LCD, and/or LED technologies, or other technologies now known or later developed. User interface 904 may also be configured to generate audible output(s), via a speaker, speaker jack, audio output port, audio output device, earphones, and/or other similar devices.

In some embodiments, user interface 904 may include a display that serves to present video or other images to a user (e.g., images rendered based on volumetric density information generated using the imaging components 924 and/or generated according to the methods described herein). Additionally, user interface 904 may include one or more buttons, switches, knobs, and/or dials that facilitate the configuration and operation of the imaging components 924, the reconstruction of volumetric density information using the imaging components 924, or to configure some other operation of the computing device 900. It may be possible that some or all of these buttons, switches, knobs, and/or dials are implemented as functions on a touch- or presence-sensitive panel.

Processor 906 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image registration and/or scaling, and tomographic reconstruction, among other applications or functions. Data storage 908 may include one or more volatile and/or non-volatile storage components, such as magnetic, optical, flash, or organic storage, and may be integrated in whole or in part with processor 906. Data storage 908 may include removable and/or non-removable components.

Processor 906 may be capable of executing program instructions 918 (e.g., compiled or non-compiled program logic and/or machine code) stored in data storage 908 to carry out the various functions described herein. Therefore, data storage 908 may include a non-transitory computer-readable medium, having stored thereon program instructions that, upon execution by computing device 900, cause computing device 900 to carry out any of the methods, processes, or functions disclosed in this specification and/or the accompanying drawings.

By way of example, program instructions 918 may include an operating system 922 (e.g., an operating system kernel, device driver(s), and/or other modules) and one or more application programs 920 (e.g., sample scanning functions, reconstruction or rendering functions) installed on computing device 900.

Application programs 920 may take the form of "apps" that could be downloadable to computing device 900 through one or more online application stores or application markets (via, e.g., the communication interface 902). However, application programs can also be installed on computing device 900 in other ways, such as via a web browser or through a physical interface (e.g., a USB port) of the computing device 900.

In some examples, portions of the methods described herein could be performed by different devices, according to an application. For example, different devices of a system could have different amounts of computational resources (e.g., memory, processor cycles) and different information bandwidths for communication between the devices. For example, a first device could be a radiologist's workstation or remote interface that could transmit commands and/or requests for images to another device or server that has the necessary computational resources to perform the reconstruction and/or rendering methods described herein to satisfy the transmitted commands or requests. Different portions of the methods described herein could be apportioned according to such considerations.

V. Example Methods

Figure 10:
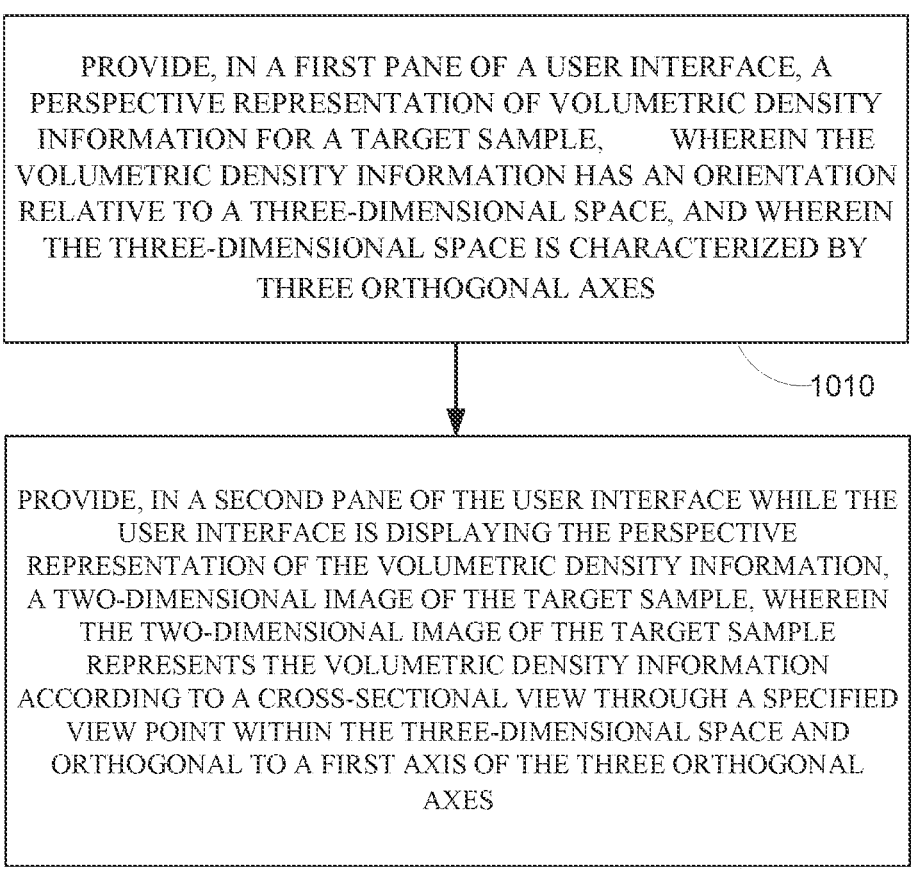
FIG. 10 is a flowchart of a method, according to an example embodiment.

FIG. 10 is a flowchart of a method 1000 for providing a user interface. The method 1000 includes providing, in a first pane of a user interface, a perspective representation of volumetric density information for a target sample, wherein the volumetric density information has an orientation relative to a three-dimensional space, and wherein the three-dimensional space is characterized by three orthogonal axes (1010). The method 1000 additionally includes providing, in a second pane of the user interface while the user interface is displaying the perspective representation of the volumetric density information, a two-dimensional image of the target sample, wherein the two-dimensional image of the target sample represents the volumetric density information according to a cross-sectional view through a specified view point within the three-dimensional space and orthogonal to a first axis of the three orthogonal axes (1020). The method 1000 could include additional elements or features.

VI. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The embodiments herein are described as being used by radiologists, surgeons, and other healthcare professionals to intra-operatively image tissue samples and to visualize the resulting image data to inform to continuation or completion of an ongoing surgical procedure. However, these are merely illustrative example applications. The embodiments described herein could be employed to image other objects or substances of interest (e.g., electronics or machinery, plant or animal tissue, archeological artifacts) and to visualize the resulting image data. Additionally, the embodiments described herein could be employed in other applications, e.g., to image tissue samples in order to target portions of the sample for microscopy, laboratory testing, or other pathology analysis techniques.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

VII. Enumerated Example Embodiments

Embodiments of the present disclosure may thus relate to one of the enumerated example embodiments (EEEs) listed below. It will be appreciated that features indicated with respect to one EEE can be combined with other EEEs.

EEE 1 is a system comprising: (i) a portable housing; (ii) an imager disposed on or within the housing, wherein the imager is operable to image samples of interest; (iii) a communications interface disposed on or within the housing; and (iv) a controller disposed on or within the housing, wherein the controller comprises one or more processors programmed to perform controller operations, wherein the controller is operably coupled to the image and to the communications interface, and wherein the controller operations comprise: (a) operating the imager to generate scan data for a target sample; (b) based on the scan data, using a reconstruction process to generate volumetric density information for the target sample; (c) receiving, from a remote system via the communications interface, a request for a particular cross-sectional view of the target sample; (d) responsive to receiving the request for the particular cross-sectional view of the target sample, rendering a two-dimensional image of the target sample from the volumetric density information, wherein the two-dimensional image of the target sample represents the target sample according to the requested particular cross-sectional view; and (e) transmitting, to the remote system via the communications interface, an indication of the two-dimensional image.

EEE 2 is the system of EEE 1, wherein the imager is a micro-CT imager comprising an X-ray source, an X-ray imager, and a sample receptacle configured to contain the target sample, wherein the X-ray source and the X-ray imager define a field of view, and wherein operating the imager to generate scan data for the target sample comprises rotating the sample receptacle and operating the X-ray source and the X-ray imager to generate a plurality of X-ray images of the target sample.

EEE 3 is the system of EEE 2, wherein the field of view encompasses less than all of the sample receptacle such that at least one X-ray image of the plurality of X-ray images represents less than all of the target sample.

EEE 4 is the system of EEE 3, wherein the field of view has a largest dimension that is less than a largest dimension of the target sample.

EEE 5 is the system of any of EEEs 2-4, further comprising a linear actuator that is mechanically coupled to the sample receptacle, and wherein operating the imager to generate scan data for the target sample comprises operating the linear actuator to move at least a portion of the sample receptacle within the field of view.

EEE 6 is the system of EEE 5, further comprising a visible-light camera configured to image the sample receptacle when the sample receptacle is at least partially within the field of view.

EEE 7 is the system of any of EEEs 5-6, wherein the sample receptacle is removably coupled to the linear actuator.

EEE 8 is the system of any of EEEs 2-7, further comprising: a door; and a door actuator, wherein operating the imager to generate scan data for the target sample comprises operating the door actuator to actuate the door from an open position to a closed position, wherein the door being in the open position allows the target sample to be loaded into the imager, and wherein the door being in the closed position reduces an amount of X-ray radiation that is emitted into an environment of the imager when the X-ray source is operated to generate the plurality of X-ray images of the target sample.

EEE 9 is the system of EEE 2, further comprising: a linear actuator that is mechanically coupled to the sample receptacle; wherein operating the imager to generate scan data for the target sample comprises receiving a first command to image the target sample in a first mode, wherein operating the imager to generate scan data for the target sample comprises operating the linear actuator to move the sample receptacle such that all of the target sample is within the field of view, and wherein the controller operations further comprise: responsive to receiving a second command to image a second sample in a second mode, operating the imager to generate additional scan data for the second sample, wherein operating the imager to generate additional scan data for the second sample comprises operating the linear actuator to move the sample receptacle such that less than all of the second sample is within the field of view, rotating the sample receptacle, and operating the X-ray source and the X-ray imager to generate a second plurality of X-ray images of the second sample.

EEE 10 is the system of any of EEEs 2-9, wherein using a reconstruction process to generate volumetric density information for the target sample comprises using a reduced view reconstruction algorithm or a sparse view reconstruction algorithm, and wherein rotating the sample receptacle and operating the X-ray source and the X-ray imager to generate a plurality of X-ray images of the target sample occurs over a period of less than ten minutes.

EEE 11 is the system of any of EEEs 2-10, wherein using a reconstruction process to generate volumetric density information for the target sample comprises using a reduced view reconstruction algorithm or a sparse view reconstruction algorithm, and wherein rotating the sample receptacle and operating the X-ray source and the X-ray imager to generate a plurality of X-ray images of the target sample consisting of fewer than 300 X-ray images of the target sample.

EEE 12 is the system of any of EEEs 2-11, wherein the plurality of X-ray images of the target sample represent X-ray views through the target sample at a non-uniformly spaced set of angles or at a set of angles that span less than 300 degrees.

EEE 13 is the system of any of EEEs 1-13, further comprising: a user interface that comprises a display.

EEE 14 is the system of EEE 13, wherein the controller operations further comprise: receiving, via the user interface, a command to image the target sample, wherein operating the imager to generate scan data for a target sample occurs in response to receiving the command to image the target sample.

EEE 15 is the system of any of EEEs 13-14, wherein the user interface is disposed on or within the housing.

EEE 16 is the system of any of EEEs 13-14, wherein the user interface is part of a remote unit that is in wired or wireless communication with the controller via the communication interface.

EEE 17 is system of any of EEEs 13-16, wherein the user interface is configured to receive touchless gestural commands.

EEE 18 is the system of any of EEEs 13-17, wherein the controller operations further comprise: causing the user interface to display a perspective representation of the volumetric density information.

EEE 19 is the system of EEE 18, wherein the controller operations further comprise: determining, based on the volumetric density information, an outside surface of the target sample; and determining, based on the volumetric density information, a segmentation map of one or more volumes of interest within the target sample; and based on the determined outside surface of the target sample and the determined segmentation map, determining a segmentation surface color coding for the segmentation map that color-codes a plurality of points on a surface of the segmentation map according to their respective distances to respective nearest points on the determined outside surface of the target sample, wherein causing the user interface to display a perspective representation of the volumetric density information comprises causing the user interface to display a perspective view of the segmentation map within the outside surface of the target sample and with the segmentation map colored according to the determined segmentation surface color coding.

EEE 20 is the system of EEE 19, wherein transmitting, to the remote system via the communications interface, the indication of the two-dimensional image comprises transmitting an indication of at least a portion of the segmentation map, and wherein the controller operations further comprise: receiving, from a remote system via the communications interface, an indication of an update to the segmentation map; and prior to determining the segmentation surface color coding for the segmentation map, updating the segmentation map based on the received indication of the update to the segmentation map.

EEE 21 is the system of EEE 20, wherein causing the user interface to display a perspective representation of the volumetric density information comprises providing an indication of an orientation of the volumetric density information relative to a three-dimensional space, and wherein the controller operations further comprise: receiving, via the user interface, an indication of an updated orientation of the volumetric density information relative to the three-dimensional space; and transmitting, to the remote system via the communications interface, an updated orientation of the volumetric density information relative to the three-dimensional space.

EEE 22 is the system of EEE 18, wherein the controller operations further comprise: determining, based on the volumetric density information, an outside surface of the target sample; and based on the determined outside surface of the target sample, determining an outside surface color coding for the outside surface that color-codes a plurality of points on the outside surface based on their respective surface normal orientations relative to a three-dimensional space, wherein causing the user interface to display a perspective representation of the volumetric density information comprises causing the user interface to display a perspective view of the outside surface of the target sample with the outside surface colored according to the determined outside surface color coding.

EEE 23 is the system of EEE 22, wherein determining the outside surface color coding comprises determining a color coding having an enumerated set of colors that corresponds to an enumerated set of directions in the three-dimensional space.

EEE 24 is the system of EEE 22, wherein the controller operations further comprise: receiving, via the user interface, an indication of an updated orientation of the volumetric density information relative to the three-dimensional space; based on the determined outside surface of the target sample and the updated orientation of the volumetric density information relative to the three-dimensional space, determining an updated outside surface color coding for the outside surface that color-codes a plurality of points on the outside surface based on their respective updated surface normal orientations relative to a three-dimensional space; and causing the user interface to display an updated perspective view of the outside surface of the target sample with the outside surface colored according to the determined updated outside surface color coding.

EEE 25 is the system of EEE 18, wherein the controller operations further comprise: determining, based on the volumetric density information, an outside surface of the target sample; and, based on the determined outside surface of the target sample and the volumetric density information, determining an outside surface color coding for the outside surface that color-codes a plurality of points on the outside surface based on the density of respective proximate portions of the volumetric density information, wherein causing the user interface to display a perspective representation of the volumetric density information comprises causing the user interface to display a perspective view of the outside surface of the target sample with the outside surface colored according to the determined outside surface color coding.

EEE 26 is the system of EEE 18, wherein the volumetric density information has an orientation relative to a three-dimensional space, wherein the three-dimensional space is characterized by three orthogonal axes, and wherein the controller operations further comprise: rendering a second two-dimensional image of the target sample from the volumetric density information, wherein the second two-dimensional image of the target sample represents the target sample according to a cross-sectional view through a specified view point within the three-dimensional space and orthogonal to a first axis of the three orthogonal axes; and causing the user interface to display the second two-dimensional image of the target sample while the user interface is displaying the perspective representation of the volumetric density information.

EEE 27 is the system of EEE 26, wherein the controller operations further comprise: receiving, via the user interface, a command to display an image of the target sample orthogonal to a second axis of the three orthogonal axes; responsive to receiving the command to display an image of the target sample orthogonal to a second axis, rendering a third two-dimensional image of the target sample from the volumetric density information, wherein the third two-dimensional image of the target sample represents the target sample according to a cross-sectional view through the specified view point within the three-dimensional space and orthogonal to the second axis; and causing the user interface to display the third two-dimensional image of the target sample while the user interface is displaying the perspective representation of the volumetric density information.

EEE 28 is the system of any of EEEs 26-27, wherein the controller operations further comprise: receiving, via the user interface, an indication of an updated orientation of the volumetric density information relative to the three-dimensional space; rendering a fourth two-dimensional image of the target sample from the volumetric density information, wherein the fourth two-dimensional image of the target sample represents the target sample according to a cross-sectional view through the specified view point within the three-dimensional space and orthogonal to the first axis according to the updated orientation of the volumetric density information relative to the three-dimensional space; and responsive to receiving the updated orientation of the volumetric density information relative to the three-dimensional space, causing the user interface to display the fourth two-dimensional image of the target sample.

EEE 29 is the system of any of EEEs 26-28, wherein the controller operations further comprise: receiving, via the user interface, an indication of a point of interest within the second two-dimensional image of the target sample; and responsive to receiving the indication of the point of interest within the second two-dimensional image of the target sample, causing the user interface to indicate the location, within the perspective representation of the volumetric density information, of the point of interest.

EEE is the system of any of EEEs 26-28, wherein the controller operations further comprise: receiving, via the user interface, an indication of a point of interest within the perspective representation of the volumetric density information; responsive to receiving the indication of the point of interest within the perspective representation of the volumetric density information, rendering a fifth two-dimensional image of the target sample from the volumetric density information, wherein the fifth two-dimensional image of the target sample represents the target sample according to a cross-sectional view through the point of interest within the three-dimensional space; and causing the user interface to display the fifth two-dimensional image of the target sample while the user interface is displaying the perspective representation of the volumetric density information.

EEE 31 is the system of EEE 30, wherein the controller operations further comprise: causing the user interface to indicate the location, within the fifth two-dimensional image of the target sample, of the point of interest.

EEE 32 is the system of any of EEEs 30-31, wherein receiving an indication of a point of interest within the perspective representation of the volumetric density information comprises receiving, via the user interface, an indication of a point on the display on which a portion of the perspective representation is being displayed, and wherein the controller operations further comprise: determining, based on the indicated point on the display, a corresponding columnar portion of the volumetric density information; and determining the location, within the three dimensional space, of the point of interest by determining the location of a maximal-density region within the columnar portion of the volumetric density information.

EEE 33 is a method for providing a user interface, the method comprising: (i) providing, in a first pane of a user interface, a perspective representation of volumetric density information for a target sample, wherein the volumetric density information has an orientation relative to a three-dimensional space, and wherein the three-dimensional space is characterized by three orthogonal axes; and (ii) providing, in a second pane of the user interface while the user interface is displaying the perspective representation of the volumetric density information, a two-dimensional image of the target sample, wherein the two-dimensional image of the target sample represents the volumetric density information according to a cross-sectional view through a specified view point within the three-dimensional space and orthogonal to a first axis of the three orthogonal axes.

EEE 34 is the method of EEE 33, further comprising: determining, based on the volumetric density information, an outside surface of the target sample; and determining, based on the volumetric density information, a segmentation map of one or more volumes of interest within the target sample; and based on the determined outside surface of the target sample and the determined segmentation map, determining a segmentation surface color coding for the segmentation map that color-codes a plurality of points on a surface of the segmentation map according to their respective distances to respective nearest points on the determined outside surface of the target sample, wherein providing the perspective representation of the volumetric density information comprises providing a perspective view of the segmentation map within the outside surface of the target sample and with the segmentation map colored according to the determined segmentation surface color coding.

EEE 35 is the method of EEE 34, further comprising: receiving a user indication of an update to the segmentation map; and updating the segmentation map based on the received indication of the update to the segmentation map.

EEE 36 is the method of EEE 35, wherein providing the perspective representation of the volumetric density information comprises providing an indication of an orientation of the volumetric density information relative to the three-dimensional space, and wherein the method further comprises: receiving an indication of an updated orientation of the volumetric density information relative to the three-dimensional space; and providing an updated perspective representation of the volumetric density information based on the updated orientation of the volumetric density information relative to the three-dimensional space.

EEE 37 is the method of EEE 33, further comprising: determining, based on the volumetric density information, an outside surface of the target sample; and based on the determined outside surface of the target sample, determining an outside surface color coding for the outside surface that color-codes a plurality of points on the outside surface based on their respective surface normal orientations relative to a three-dimensional space, wherein providing the perspective representation of the volumetric density information comprises providing a perspective view of the outside surface of the target sample with the outside surface colored according to the determined outside surface color coding.

EEE 38 is the method of EEE 37, wherein determining the outside surface color coding comprises determining a color coding having an enumerated set of colors that corresponds to an enumerated set of directions in the three-dimensional space.

EEE 39 is the method of EEE 33, further comprising: determining, based on the volumetric density information, an outside surface of the target sample; and based on the determined outside surface of the target sample and the volumetric density information, determining an outside surface color coding for the outside surface that color-codes a plurality of points on the outside surface based on the density of respective proximate portions of the volumetric density information, wherein providing the perspective representation of the volumetric density information comprises providing a perspective view of the outside surface of the target sample with the outside surface colored according to the determined outside surface color coding.

EEE 40 is the method of EEE 33, further comprising: receiving, from a user, a command to display an image of the target sample orthogonal to a second axis of the three orthogonal axes; and providing, in the second pane responsive to receiving the command to display an image of the target sample orthogonal to a second axis while the user interface is displaying the perspective representation of the volumetric density information, a second two-dimensional image of the target sample, wherein the second two-dimensional image of the target sample represents the volumetric density information according to a cross-sectional view through the specified view point within the three-dimensional space and orthogonal to the second axis.

EEE 41 is the method of any of EEEs 33-40, further comprising: receiving, from a user, an indication of an updated orientation of the volumetric density information relative to the three-dimensional space; and providing, in the second pane responsive to receiving the indication of an updated orientation of the volumetric density information relative to the three-dimensional space while the user interface is displaying the perspective representation of the volumetric density information, a third two-dimensional image of the target sample, wherein the third two-dimensional image of the target sample represents the volumetric density information according to a cross-sectional view through the specified view point within the three-dimensional space and orthogonal to the first axis according to the updated orientation of the volumetric density information relative to the three-dimensional space.

EEE 42 is the method of any of EEEs 33-41, further comprising: receiving, from a user, an indication of a point of interest within the two-dimensional image of the target sample; and responsive to receiving the indication of the point of interest within the second two-dimensional image of the target sample, providing in the first pane an indication of the location, within the perspective representation of the volumetric density information, of the point of interest.

EEE 43 is the method of any of EEEs 33-41, further comprising: receiving, from a user, an indication of a point of interest within the perspective representation of the volumetric density information; and providing, in the second pane responsive to receiving the indication of the point of interest within the perspective representation of the volumetric density information, a fourth two-dimensional image of the target sample, wherein the fourth two-dimensional image of the target sample represents the volumetric density information according to a cross-sectional view through the point of interest within the three-dimensional space.

EEE 44 is the method of EEE 43, further comprising: providing an indication in the second pane of the location, within the fourth two-dimensional image of the target sample, of the point of interest.

EEE 45 is the method of any of EEEs 43-44, wherein receiving an indication of a point of interest within the perspective representation of the volumetric density information comprises receiving, from a user, an indication of a point on a display on which a portion of the perspective representation is being provided, and wherein the method further comprises: determining, based on the indicated point on the display, a corresponding columnar portion of the volumetric density information; and determining the location, within the three dimensional space, of the point of interest by determining the location of a maximal-density region within the columnar portion of the volumetric density information.

EEE 46 is a micro-CT imaging system comprising: (i) a micro-CT imager comprising an X-ray source, an X-ray imager, and a sample receptacle configured to contain a target sample, wherein the X-ray source and the X-ray imager define a field of view; and (ii) a controller, wherein the controller comprises one or more processors programmed to perform controller operations, wherein the controller is operably coupled to the image and to the communications interface, and wherein the controller operations comprise: operating the imager to generate scan data for a target sample, wherein operating the imager to generate scan data for the target sample comprises rotating the sample receptacle and operating the X-ray source and the X-ray imager to generate a plurality of X-ray images of the target sample.

EEE 47 is the micro-CT imaging system of EEE 46, wherein the field of view encompasses less than all of the sample receptacle such that at least one X-ray image of the plurality of X-ray images represents less than all of the target sample.

EEE 48 is the micro-CT imaging system of EEE 47, wherein the field of view has a largest dimension that is less than a largest dimension of the target sample.

EEE 49 is the micro-CT imaging system of any of EEEs 46-48, further comprising a linear actuator that is mechanically coupled to the sample receptacle, and wherein operating the imager to generate scan data for the target sample comprises operating the linear actuator to move at least a portion of the sample receptacle within the field of view.

EEE 50 is the micro-CT imaging system of EEE 49, further comprising a visible-light camera configured to image the sample receptacle when the sample receptacle is at least partially within the field of view.

EEE 51 is the micro-CT imaging system of any of EEEs 49-50, wherein the sample receptacle is removably coupled to the linear actuator.

EEE 52 is the micro-CT imaging system of any of EEEs 46-51, further comprising: a door; and a door actuator, wherein operating the imager to generate scan data for the target sample comprises operating the door actuator to actuate the door from an open position to a closed position, wherein the door being in the open position allows the target sample to be loaded into the imager, and wherein the door being in the closed position reduces an amount of X-ray radiation that is emitted into an environment of the imager when the X-ray source is operated to generate the plurality of X-ray images of the target sample.

EEE 53 is the micro-CT imaging system of EEE 46, further comprising: a linear actuator that is mechanically coupled to the sample receptacle; wherein operating the imager to generate scan data for the target sample comprises receiving a first command to image the target sample in a first mode, wherein operating the imager to generate scan data for the target sample comprises operating the linear actuator to move the sample receptacle such that all of the target sample is within the field of view, and wherein the controller operations further comprise: responsive to receiving a second command to image a second sample in a second mode, operating the imager to generate additional scan data for the second sample, wherein operating the imager to generate additional scan data for the second sample comprises operating the linear actuator to move the sample receptacle such that less than all of the second sample is within the field of view, rotating the sample receptacle, and operating the X-ray source and the X-ray imager to generate a second plurality of X-ray images of the second sample.

EEE 54 is the micro-CT imaging system of any of EEEs 46-53, wherein the controller operations further comprise using a reduced view reconstruction algorithm or a sparse view reconstruction algorithm to generate volumetric density information for the target sample, and wherein rotating the sample receptacle and operating the X-ray source and the X-ray imager to generate a plurality of X-ray images of the target sample occurs over a period of less than ten minutes.

EEE 55 is the micro-CT imaging system of any of EEEs 46-54, wherein the controller operations further comprise using a reduced view reconstruction algorithm or a sparse view reconstruction algorithm to generate volumetric density information for the target sample, and wherein rotating the sample receptacle and operating the X-ray source and the X-ray imager to generate a plurality of X-ray images of the target sample consisting of fewer than 300 X-ray images of the target sample.

EEE 56 is the micro-CT imaging system of any of EEEs 46-55, wherein the plurality of X-ray images of the target sample represent X-ray views through the target sample at a non-uniformly spaced set of angles or at a set of angles that span less than 300 degrees.

EEE 57 is a non-transitory computer-readable medium, configured to store at least computer-readable instructions that, when executed by one or more processors of a computing device, causes the computing device to perform controller operations to perform the method of any of EEEs 33-45 or to perform the controller operations described in any of EEEs 1-32 or 46-56.

We claim:

1. A system comprising:
   a portable housing;
   an imager disposed on or within the housing, wherein the imager is operable to image samples of interest;
   a communications interface disposed on or within the housing; and
   a controller disposed on or within the housing, wherein the controller comprises one or more processors programmed to perform controller operations, wherein the controller is operably coupled to the image and to the communications interface, and wherein the controller operations comprise:
      operating the imager to generate scan data for a target sample;
      based on the scan data, using a reconstruction process to generate volumetric density information for the target sample;
      receiving, from a remote system via the communications interface, a request for a particular cross-sectional view, at a specified orientation and through a specified location, of the target sample;
      responsive to receiving the request for the particular cross-sectional view of the target sample, rendering a two-dimensional image of the target sample from the volumetric density information, wherein the two-dimensional image of the target sample represents the target sample according to the requested particular cross-sectional view at the specified orientation and through the specified location; and transmitting, to the remote system via the communications interface, an indication of the two-dimensional image.

2. The system of claim 1, wherein the imager is a micro-CT imager comprising an X-ray source, an X-ray imager, and a sample receptacle configured to contain the target sample, wherein the X-ray source and the X-ray imager define a field of view, and wherein operating the imager to generate scan data for the target sample comprises rotating the sample receptacle and operating the X-ray source and the X-ray imager to generate a plurality of X-ray images of the target sample.

3. The system of claim 2, wherein the field of view encompasses less than all of the sample receptacle such that at least one X-ray image of the plurality of X-ray images represents less than all of the target sample.

4. The system of claim 3, wherein the field of view has a largest dimension that is less than a largest dimension of the target sample.

5. The system of claim 2, further comprising a linear actuator that is mechanically coupled to the sample receptacle, and wherein operating the imager to generate scan data for the target sample comprises operating the linear actuator to move at least a portion of the sample receptacle within the field of view.

6. The system of claim 5, further comprising a visible-light camera configured to image the sample receptacle when the sample receptacle is at least partially within the field of view.

7. The system of claim 5, wherein the sample receptacle is removably coupled to the linear actuator.

8. The system of claim 2, further comprising:
a door; and
a door actuator, wherein operating the imager to generate scan data for the target sample comprises operating the door actuator to actuate the door from an open position to a closed position, wherein the door being in the open position allows the target sample to be loaded into the imager, and wherein the door being in the closed position reduces an amount of X-ray radiation that is emitted into an environment of the imager when the X-ray source is operated to generate the plurality of X-ray images of the target sample.

9. The system of claim 2, further comprising:
a linear actuator that is mechanically coupled to the sample receptacle;
wherein operating the imager to generate scan data for the target sample comprises receiving a first command to image the target sample in a first mode, wherein operating the imager to generate scan data for the target sample comprises operating the linear actuator to move the sample receptacle such that all of the target sample is within the field of view, and wherein the controller operations further comprise:
responsive to receiving a second command to image a second sample in a second mode, operating the imager to generate additional scan data for the second sample, wherein operating the imager to generate additional scan data for the second sample comprises operating the linear actuator to move the sample receptacle such that less than all of the second sample is within the field of view, rotating the sample receptacle, and operating the X-ray source and the X-ray imager to generate a second plurality of X-ray images of the second sample.

10. The system of claim 2, wherein using a reconstruction process to generate volumetric density information for the target sample comprises using a reduced view reconstruction algorithm or a sparse view reconstruction algorithm, and wherein rotating the sample receptacle and operating the X-ray source and the X-ray imager to generate a plurality of X-ray images of the target sample occurs over a period of less than ten minutes.

11. The system of claim 2, wherein using a reconstruction process to generate volumetric density information for the target sample comprises using a reduced view reconstruction algorithm or a sparse view reconstruction algorithm, and wherein rotating the sample receptacle and operating the X-ray source and the X-ray imager to generate a plurality of X-ray images of the target sample consisting of fewer than 300 X-ray images of the target sample.

12. The system of claim 2, wherein the plurality of X-ray images of the target sample represent X-ray views through the target sample at a non-uniformly spaced set of angles or at a set of angles that span less than 300 degrees.

13. The system of claim 1, further comprising:
a user interface that comprises a display.

14. The system of claim 13, wherein the controller operations further comprise:
receiving, via the user interface, a command to image the target sample, wherein operating the imager to generate scan data for a target sample occurs in response to receiving the command to image the target sample.

15. The system of claim 13, wherein the user interface is disposed on or within the housing.

16. The system of claim 13, wherein the user interface is part of a remote unit that is in wired or wireless communication with the controller via the communication interface.

17. The system of claim 13, wherein the user interface is configured to receive touchless gestural commands.

18. The system of claim 13, wherein the controller operations further comprise:
causing the user interface to display a perspective representation of the volumetric density information.

19. The system of claim 18, wherein the controller operations further comprise:
determining, based on the volumetric density information, an outside surface of the target sample; and
determining, based on the volumetric density information, a segmentation map of one or more volumes of interest within the target sample; and
based on the determined outside surface of the target sample and the determined segmentation map, determining a segmentation surface color coding for the segmentation map that color-codes a plurality of points on a surface of the segmentation map according to their respective distances to respective nearest points on the determined outside surface of the target sample,
wherein causing the user interface to display a perspective representation of the volumetric density information comprises causing the user interface to display a perspective view of the segmentation map within the outside surface of the target sample and with the segmentation map colored according to the determined segmentation surface color coding.

20. The system of claim 19, wherein transmitting, to the remote system via the communications interface, the indication of the two-dimensional image comprises transmitting an indication of at least a portion of the segmentation map, and wherein the controller operations further comprise:
- receiving, from a remote system via the communications interface, an indication of an update to the segmentation map; and
- prior to determining the segmentation surface color coding for the segmentation map, updating the segmentation map based on the received indication of the update to the segmentation map.

21. The system of claim 20, wherein causing the user interface to display a perspective representation of the volumetric density information comprises providing an indication of an orientation of the volumetric density information relative to a three-dimensional space, and wherein the controller operations further comprise:
- receiving, via the user interface, an indication of an updated orientation of the volumetric density information relative to the three-dimensional space; and
- transmitting, to the remote system via the communications interface, an updated orientation of the volumetric density information relative to the three-dimensional space.

22. The system of claim 18, wherein the controller operations further comprise:
- determining, based on the volumetric density information, an outside surface of the target sample; and
- based on the determined outside surface of the target sample, determining an outside surface color coding for the outside surface that color-codes a plurality of points on the outside surface based on their respective surface normal orientations relative to a three-dimensional space,
- wherein causing the user interface to display a perspective representation of the volumetric density information comprises causing the user interface to display a perspective view of the outside surface of the target sample with the outside surface colored according to the determined outside surface color coding.

23. The system of claim 22, wherein determining the outside surface color coding comprises determining a color coding having an enumerated set of colors that corresponds to an enumerated set of directions in the three-dimensional space.

24. The system of claim 22, wherein the controller operations further comprise:
- receiving, via the user interface, an indication of an updated orientation of the volumetric density information relative to the three-dimensional space;
- based on the determined outside surface of the target sample and the updated orientation of the volumetric density information relative to the three-dimensional space, determining an updated outside surface color coding for the outside surface that color-codes a plurality of points on the outside surface based on their respective updated surface normal orientations relative to a three-dimensional space; and
- causing the user interface to display an updated perspective view of the outside surface of the target sample with the outside surface colored according to the determined updated outside surface color coding.

25. The system of claim 18, wherein the controller operations further comprise:
- determining, based on the volumetric density information, an outside surface of the target sample; and
- based on the determined outside surface of the target sample and the volumetric density information, determining an outside surface color coding for the outside surface that color-codes a plurality of points on the outside surface based on the density of respective proximate portions of the volumetric density information,
- wherein causing the user interface to display a perspective representation of the volumetric density information comprises causing the user interface to display a perspective view of the outside surface of the target sample with the outside surface colored according to the determined outside surface color coding.

26. The system of claim 18, wherein the volumetric density information has an orientation relative to a three-dimensional space, wherein the three-dimensional space is characterized by three orthogonal axes, and wherein the controller operations further comprise:
- rendering a second two-dimensional image of the target sample from the volumetric density information, wherein the second two-dimensional image of the target sample represents the target sample according to a cross-sectional view through a specified view point within the three-dimensional space and orthogonal to a first axis of the three orthogonal axes; and
- causing the user interface to display the second two-dimensional image of the target sample while the user interface is displaying the perspective representation of the volumetric density information.

27. The system of claim 26, wherein the controller operations further comprise:
- receiving, via the user interface, a command to display an image of the target sample orthogonal to a second axis of the three orthogonal axes;
- responsive to receiving the command to display an image of the target sample orthogonal to a second axis, rendering a third two-dimensional image of the target sample from the volumetric density information, wherein the third two-dimensional image of the target sample represents the target sample according to a cross-sectional view through the specified view point within the three-dimensional space and orthogonal to the second axis; and
- causing the user interface to display the third two-dimensional image of the target sample while the user interface is displaying the perspective representation of the volumetric density information.

28. The system of claim 26, wherein the controller operations further comprise:
- receiving, via the user interface, an indication of an updated orientation of the volumetric density information relative to the three-dimensional space;
- rendering a fourth two-dimensional image of the target sample from the volumetric density information, wherein the fourth two-dimensional image of the target sample represents the target sample according to a cross-sectional view through the specified view point within the three-dimensional space and orthogonal to the first axis according to the updated orientation of the volumetric density information relative to the three-dimensional space; and
- responsive to receiving the updated orientation of the volumetric density information relative to the three-dimensional space, causing the user interface to display the fourth two-dimensional image of the target sample.

29. The system of claim 26, wherein the controller operations further comprise:
- receiving, via the user interface, an indication of a point of interest within the second two-dimensional image of the target sample; and responsive to receiving the indication of the point of interest within the second two-dimensional image of the target sample, causing the user interface to indicate the location, within the perspective representation of the volumetric density information, of the point of interest.

30. The system of claim 26, wherein the controller operations further comprise:
receiving, via the user interface, an indication of a point of interest within the perspective representation of the volumetric density information;
responsive to receiving the indication of the point of interest within the perspective representation of the volumetric density information, rendering a fifth two-dimensional image of the target sample from the volumetric density information, wherein the fifth two-dimensional image of the target sample represents the target sample according to a cross-sectional view through the point of interest within the three-dimensional space; and
causing the user interface to display the fifth two-dimensional image of the target sample while the user interface is displaying the perspective representation of the volumetric density information.

31. The system of claim 30, wherein the controller operations further comprise:
causing the user interface to indicate the location, within the fifth two-dimensional image of the target sample, of the point of interest.

32. The system of claim 30, wherein receiving an indication of a point of interest within the perspective representation of the volumetric density information comprises receiving, via the user interface, an indication of a point on the display on which a portion of the perspective representation is being displayed, and wherein the controller operations further comprise:
determining, based on the indicated point on the display, a corresponding columnar portion of the volumetric density information; and
determining the location, within the three dimensional space, of the point of interest by determining the location of a maximal-density region within the columnar portion of the volumetric density information.

* * * * *